(12) United States Patent
Nishimoto et al.

(10) Patent No.: US 7,841,657 B2
(45) Date of Patent: Nov. 30, 2010

(54) CUSHION FOR RETAINING POSTURE OF CHILD AND STRUCTURE USING SAME CUSHION

(75) Inventors: Noriko Nishimoto, Saitama (JP); Shushi Hosoya, Saitama (JP); Masaharu Inoue, Saitama (JP); Momoe Kamei, Saitama (JP); Ryoichi Yumoto, Saitama (JP)

(73) Assignee: Combi Corporation, Tokyo (JP)

( * ) Notice: Subject to any disclaimer, the term of this patent is extended or adjusted under 35 U.S.C. 154(b) by 464 days.

(21) Appl. No.: 11/539,385

(22) Filed: Oct. 6, 2006

(65) Prior Publication Data
US 2007/0108810 A1    May 17, 2007

(30) Foreign Application Priority Data
Oct. 7, 2005    (JP)    ............................. 2005-295016
Nov. 1, 2005    (JP)    ............................. 2005-318585

(51) Int. Cl.
*A47C 31/00* (2006.01)

(52) U.S. Cl. ............................. 297/219.12; 297/219.1; 5/655; 5/637

(58) Field of Classification Search ............ 297/219.12, 297/391, 397, 219.1, 485; 5/655, 637
See application file for complete search history.

(56) References Cited

U.S. PATENT DOCUMENTS

| | | | |
|---|---|---|---|
| D206,117 S | | 11/1966 | Levy |
| 4,383,713 A | * | 5/1983 | Roston .................. 297/228.12 |
| 4,394,783 A | * | 7/1983 | Simmons ................. 297/230.1 |
| 4,631,766 A | * | 12/1986 | Semmler et al. ............... 5/655 |
| 4,912,788 A | | 4/1990 | Lonardo |
| 5,056,533 A | * | 10/1991 | Solano ........................... 5/627 |
| 5,129,705 A | | 7/1992 | Wray et al. |
| 5,228,745 A | * | 7/1993 | Hazel ......................... 297/229 |
| 5,310,245 A | | 5/1994 | Lyszczasz |
| 5,383,711 A | | 1/1995 | Houghteling |
| 5,439,008 A | | 8/1995 | Bowman |

(Continued)

FOREIGN PATENT DOCUMENTS

EP                011039              5/1980

(Continued)

OTHER PUBLICATIONS

Patent Abstracts of Japan for JP2000-296734 published Oct. 24, 2000.

(Continued)

*Primary Examiner*—Laurie K Cranmer
(74) *Attorney, Agent, or Firm*—McDermott Will & Emery LLP

(57) ABSTRACT

A cushion adapted to be placed on a child safety seat is provided. The cushion has a head pad having a neck supporting portion protruding outwardly along the lower rim of the head pad; and a pair of head side supporting surfaces inclined upwardly toward the left/right end of the head pad; a back pad having a pair of body side supporting surfaces inclined upwardly toward the left/right end of the back pad; and a hip pad having a hip supporting surface inclined upwardly from the rear end of the hip pad toward the front end of the hip pad; and a pair of knee supporting surfaces inclined upwardly toward the left/right end of the hip pad.

9 Claims, 26 Drawing Sheets

U.S. PATENT DOCUMENTS

| | | | |
|---|---|---|---|
| 5,735,576 A | 4/1998 | Pepys et al. | |
| 5,826,287 A * | 10/1998 | Tandrup | 5/655 |
| 5,842,739 A * | 12/1998 | Noble | 297/219.12 |
| 5,916,089 A * | 6/1999 | Ive | 5/655 |
| 6,012,189 A | 1/2000 | Dudley | |
| 6,045,184 A | 4/2000 | Nakagawa | |
| 6,052,849 A | 4/2000 | Dixon et al. | |
| D427,785 S | 7/2000 | Kassai et al. | |
| 6,088,855 A * | 7/2000 | Connolly | 5/636 |
| 6,139,100 A | 10/2000 | Baskin-Lockman et al. | |
| 6,152,525 A | 11/2000 | Carine et al. | |
| 6,266,832 B1 * | 7/2001 | Ezell | 5/640 |
| 6,292,964 B1 | 9/2001 | Rose et al. | |
| 6,341,818 B1 | 1/2002 | Verbovszky et al. | |
| 6,363,558 B1 | 4/2002 | Dunne | |
| 6,415,969 B1 | 7/2002 | Higuchi et al. | |
| 6,454,352 B1 * | 9/2002 | Konovalov et al. | 297/219.12 |
| 6,481,794 B1 | 11/2002 | Kassai et al. | |
| 6,543,844 B1 * | 4/2003 | Ryan et al. | 297/219.12 |
| 6,752,457 B2 | 6/2004 | Gold et al. | |
| 6,926,359 B2 | 8/2005 | Runk | |
| 6,951,367 B1 | 10/2005 | Dinnan | |
| 7,252,330 B2 * | 8/2007 | Lincoln | 297/219.12 |
| 7,311,357 B2 * | 12/2007 | Gold et al. | 297/219.12 |
| 2002/0014793 A1 | 2/2002 | Santha | |
| 2004/0145224 A1 | 7/2004 | Kassai et al. | |
| 2004/0251721 A1 | 12/2004 | Yoshida | |
| 2005/0210592 A1 * | 9/2005 | Littlehorn et al. | 5/655 |
| 2007/0011816 A1 * | 1/2007 | Kigushi et al. | 5/655 |
| 2008/0034505 A1 * | 2/2008 | Thomas | 5/655 |
| 2009/0007336 A1 * | 1/2009 | Kassai et al. | 5/655 |

FOREIGN PATENT DOCUMENTS

| | | |
|---|---|---|
| JP | 08-107816 | 4/1996 |
| JP | 2000-296734 A | 10/2000 |
| JP | 2004-216998 A | 8/2004 |
| JP | 2005-110800 | 4/2005 |
| WO | WO-98/03369 | 1/1998 |

OTHER PUBLICATIONS

Patent Abstracts of Japan for JP2004-216998 published Oct. 5, 2004.

* cited by examiner

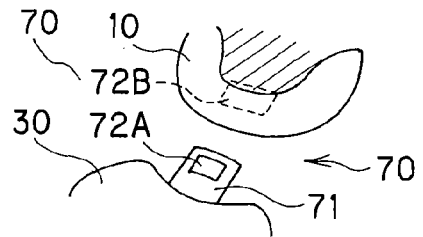
FIG.24A
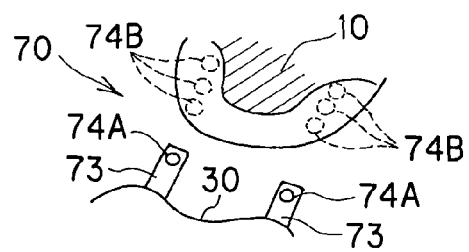
FIG.24B
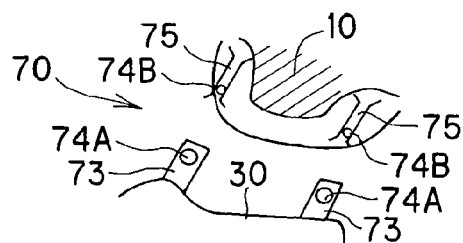
FIG.24C
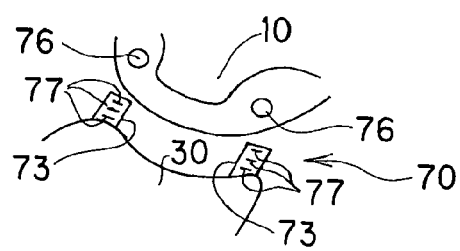
FIG.24D
FIG.24E
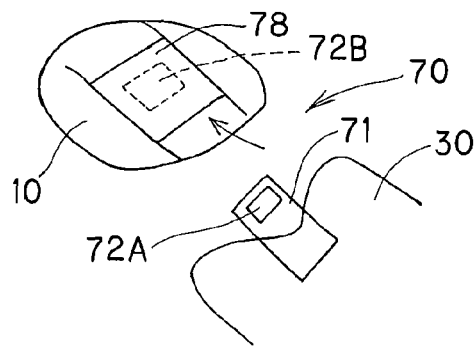

CUSHION FOR RETAINING POSTURE OF CHILD AND STRUCTURE USING SAME CUSHION

TECHNICAL FIELD

The present invention relates to a cushion for retaining the posture of a child and a structure using the cushion, these are applied to a seat of a baby buggy, a portable infant bed, a child safety seat, or the like.

RELATED ART

A cushion is proposed for a cushion applied to a child safety seat or an infant bed, in which a flat base plate is framed along its whole outer periphery with protruded portions or walls (see Patent documents 1, 2).
[Patent document 1] JP2000-A-296734
[Patent document 2] JP2004-A-216998

The conventional cushion is intended to improve protection and safeness of a child when the child is seated on a seat in a flat bed position which is selected by reclining a seat back to near horizontal. However, the same cushion is preferably applied to seat the child in a proper posture when the seat back is set back. In particular, a cushion able to suppress the side slip or the side toppling of the head, the side slip of the body core, or the forward slip of the hip of the child is desired for the child before the child is able to hold his/her head erect or to sit upright.

Accordingly, the present invention provides a cushion or a structure suitable for a child safety seat, which is able to retain a child reliably in a proper posture when the child is seated.

SUMMARY OF THE INVENTION

In order to address the above situation, a cushion adapted to be placed on a child safety seat, according to a first aspect of the present invention, includes a head pad having a neck supporting portion for supporting the neck of a child, the portion protruding outwardly along the lower rim of the head pad; and a pair of head side supporting surfaces for supporting the head of the child from the both sides, the respective surface is inclined upwardly toward the left/right end of the head pad; a back pad having a pair of body side supporting surfaces for supporting the body sides of the child, the respective surface is inclined upwardly toward the left/right end of the back pad; and a hip pad having a hip supporting surface for supporting the hip of the child, the surface is inclined upwardly from the rear end of the hip pad toward the front end of the hip pad; and a pair of knee supporting surfaces for supporting the knees of the child, the respective surface is inclined upwardly toward the left/right end of the hip pad.

According to the cushion of the first aspect of the invention, the head 10 of the child can be held in a posture in which his/her jaw is lifted up a little by supporting the neck of the child from the back with the neck-supporting portion of the head pad. Accordingly, the compression of the airway of the child can be prevented, thereby to have the child to breathe easily. The side toppling and the side slip of the head of the child can be suppressed by supporting the head of the child from the both sides with the both head side supporting surfaces, thereby to turn the head automatically to the front. Next, the side slip of the body core of the child can be prevented by supporting the torso of the child from the sides with the body side supporting surfaces of the back pad. Furthermore, since the hip supporting surface of the hip pad is inclined upwardly from the rear end toward the front end of the hip pads the forward slip of the hip toward the front of the child safety seat can be suppressed by bringing the hip supporting surface in contact with the hip of the child. Accordingly, the bend or compression of the torso due to the forward slip of the hip can be prevented. Furthermore, by supporting the knees of the childe from the sides with the knee supporting surfaces of the hip pad, the knees of the child can be flexed inward moderately, thereby to retain the lower legs in a proper direction. Accordingly, the balance of the flexor muscle and the extensor muscle of the lower body of the child can remain moderately, thereby to prevent deformation or atrophy of the body. With these operations, the child can be retained in a proper posture when he/her is seated.

In the first aspect, the ridge line of the neck supporting portion may be curved concavely toward the pair of head side supporting surfaces in the height direction from the central portion of the head pad in the left/right direction, the neck of the child can be positioned automatically at the center of the head pad in the left/right direction. By forming the head supporting portion to have the above-mentioned curve, the back side of the neck of the child can be positioned automatically at the center in the left/right direction, thereby to prevent the side slip of the head.

In the first aspect, a recess may be formed on the central portion of the head pad 10 in the left/right direction, such that the recess is framed by the neck supporting portion and the pair of head side supporting surfaces and is open to the upper rim of the head pad. In this construction, since no protruded portion exists for restraining the head of the child, the child feels more liberating.

In the first aspect, a back supporting surface for supporting the back of the child is formed between the body side supporting surfaces of the back pad, such that the back supporting surface is formed in a shape of a slope surface inclined downwardly from the lower end side of the back pad toward the upper end side of the back pad. In this construction, the effect of retaining a posture of the child with the back pad can be improved by bringing the back supporting surface, especially the lower part thereof in good contact with the waist of the child.

Furthermore, a slope surface inclined upwardly toward the back supporting surface may be formed on the end portion of the lower rim side of the back pad. In this construction, the interference between the rear end of the hip pad and the lower end of the back pad can be suppressed, thereby to arrange the hip pad and the back pad in continuity, while fitting the hip pad and the back pad to the curved or bended portion between the seat portion and the back portion of the child safety seat.

In the first aspect, the hip supporting surface of the hip pad may be curved concavely in the height direction from the central portion of the hip pad in the left/right direction. In this construction, the retention of the posture of the child with the hip supporting surfaces can be improved by bringing the hip supporting surfaces in contact with the hip, so as to wrap around the hip.

In the first aspect, the knee supporting surface of the hip pad may be extended longer toward the front of the hip pad than the hip supporting surface. In this construction, the hip is supported with the hip supporting surface, whereas the knee positioned in the front of the hip can be received reliably with the knee supporting surface 52.

Furthermore, a leg supporting surface may be formed on the hip pad in the front of the hip supporting surface, such that the leg supporting surface is inclined downwardly toward the front end of the hip pad. In this construction, the lower legs flexed inwardly with the knee supporting surfaces can be supported with the leg supporting surface in a natural posture.

In the first aspect, at least two pads of the head pad, the back pad, and the hip pad may be constructed as separate components, each of which are separable from each other. In this construction, a part of the pads can be disconnected from other pads and removed from the child safety seat. Accordingly, the usage of the cushion can be changed in accordance with the growth stage of the child.

In the first aspect, the head pad may be arranged position adjustably on the back pad along the up/down direction of the child safety seat. In this construction, the head of the child can be supported with an optimal position by adjusting the position of the head pad to the position of the head.

In order to address the above situation, a cushion for retaining a posture of a child, according to a second aspect of the present invention, is adapted to be employed to a seat in which a seat main body having enough stiffness to retain a seat shape is covered removably with a seat cover, and is adapted to provide an undulated shape to the surface of the seat cover, the cushion includes at least one pad shape component constructed as a separate component and in a different process from the seat main body and the seat cover, and fixed inseparably on the seat.

According to the cushion of the second aspect of the invention, since at least one pad shape component constituting the cushion is fixed on the seat, the pad is retained at the optimal positions on the seat, and the positional shift of the pad relative to the seat is prevented. Thus, the child can be supported with the pad shape component fixed on the seat, thereby to achieve the effect of retaining the posture of the child reliably with the pad shape component.

In the second aspect, the pad shape components may be fixed inseparably on the surface of the seat cover. According to the construction of fixing the pad shape components on the surface of the seat cover, since the pad shape components are exposed on the surface of the seat, the position where a child is retained with the pad shape components can be clearly conceived. Furthermore, the positions of the pad shape components on the seat can be changed by exchanging the seat covers.

Alternatively, the pad shape component may be fixed separably on the surface of the seat main body. In this case, the seat cover is transformed in accordance with the pad shape components fixed on the seat main body, such that an undulated shape for supporting the child appears on the surface of the seat cover. Since the seat cover can be removed from the seat main body while the pad shape components remain fixed on the seat cover, the work of removing the pad shape components from the seat cover can be saved in washing the seat cover.

In the second aspect, the cushion may include a hip pad for supporting the hip of the child as the pad shape component, and the hip pad may be fixed inseparably on the seat. Since the optimal position of supporting the hip of the child is almost unchanged regardless of the physical size of the child, the acceptable range of the physical size of the child cannot be reduced extremely, even if the hip pad is fixed inseparably to the seat. The child can be positioned such that the hip of the child fits on the hip pad. Furthermore, when the back portion of the seat having a reclining function is set back, the hip of the child is received by the hip pad fixed on the seat, thereby to prevent the forward slip of the hip.

In the construction of fixing the hip pad, a head pad for supporting the head of the child and a waist pad for supporting the waist of the child may be separably attached on the seat, in addition to the hip pad. When the physical size of the child is small In order to address the above situation, a structure for supporting a child, according to a third aspect of the present invention, includes a seat in which a seat main body having enough stiffness to retain a seat shape is covered removably with a seat cover; and a cushion providing an undulated shape for supporting the child to the surface of the seat cover, wherein the cushion is constructed as a separate component and in a different process from the seat main body and the seat cover, and wherein the cushion includes a pad shape component fixed inseparably on the surface of the seat main body, and wherein the seat cover has a through hole positioned corresponding to the position of the pad shape component fixed on the seat main body.

According to the child supporting structure of the third aspect of the invention, an undulated shape for supporting a child is provided to the surface of the seat, such that the pad shape components fixed on the seat main body protrude onto the front surface of the seat cover through the through holes of the seat cover. Since the pad shape components are fixed on the seat main body, the pad shape components are fixed at optimal positions and the positional shifts of the pad shape components on the seat do not occur. Accordingly, a child can be supported at an optimal position with the pad shape components fixed on the seat, thereby to achieve the reliable retention of the posture of the child with the pad shape components. Since the seat cover can be removed from the seat main body while the pad shape components remain fixed on the seat main body, the work of removing the pad shape components from the seat cover can be saved in washing the seat cover. Furthermore, since the pad shape components are exposed directly on the surface of the seat regardless of the existence of the core member even if the core member such as cushioning member are arranged inside the seat cover, this construction has advantage in that the retention of the posture of the child with the pad shape components is not adversely affected.

In the present invention, the term "child" means a child of a wide range of years from an infant stage up to the school age, unless otherwise noted.

BRIEF DESCRIPTION OF THE DRAWINGS

FIG. 24A illustrates an example of coupling the head pad and the back pad with the surface fasteners.

FIG. 24B illustrates an example of coupling the head pad and the back pad with the hooks.

FIG. 24C illustrates another example of coupling the head pad and the back pad with the hooks.

FIG. 24D illustrates an example of coupling the head pad and the back pad with the button.

FIG. 24E illustrates a modification from the example of FIG. 24A.

BEST MODE FOR CARRYING THE INVENTION

In the following, embodiments of the present invention will be described with reference to the drawings.

A. First Embodiment

Figure 1:
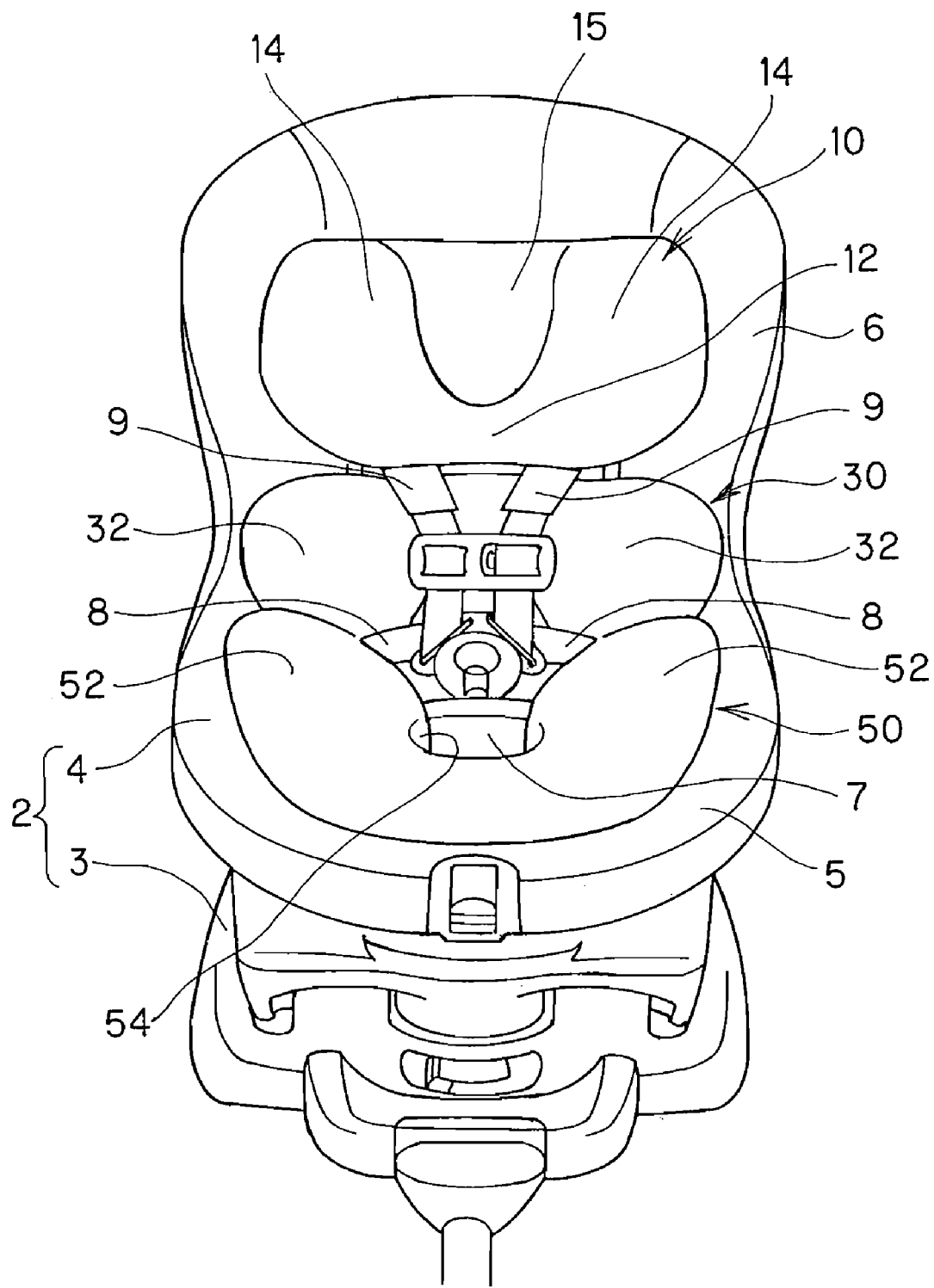
FIG. 1 is a front view of a child safety seat on which a cushion according to a first embodiment of the present invention is placed.

FIG. 1 illustrates a construction of a cushion 1 according to a first embodiment of the present invention attached on a child safety seat 2. The child safety seat 2 has a base 3 to be mounted on a seat of a vehicle and a seat main body 4 turnably mounted on the base 3 in the near horizontal directions. The seat main body 4 is formed in a single piece having a seat portion 5 and a back portion 6 for supporting the hip and the back of the child, respectively, and also has a crutch belt 7, a pair of waist belts 8, and a pair of shoulder belts 9 for restraining the child on the seat main body 4. Furthermore, the construction of the child safety seat 2 is not limited to that shown in the drawings and may be changed arbitrarily.

The cushion 1 has a head pad 10, a back pad 30, and a hip pad 50. These pads 10, 30, 50 are constructed as separate components, each of which are separable from each other. The head pad 10 is employed to support the head of the child, the back pad 30 is employed to support the back of the child, and the hip pad 50 is employed to support the hip of the child. The head pad 10 and the back pad 30 is to be placed on the back portion 6, the hip pad 50 is to be placed on the seat portion 5. Each of the pads 10, 30, 50 is separately attachable to and removable from the child safety seat 2. Furthermore, in the following, the side of the respective pad 10, 30, 50, on which the child is received, is referred as a front side, whereas the side to be contacted with the child safety seat 2 is referred as a back side. The back side of the respective pad 10, 30, 50 is shaped to fit the shape of the surface of the area on which the cushion 1 of the child safety seat 2 is placed. The up/down direction for the head pad 10 and the back pad 30 are distinguished in line with the up/down direction for the back portion 6; and the front/rear direction for the hip pad 50 is distinguished in line with the front/rear direction of the seat portion 5. The left/right direction of the pads 10, 30, 50 is expressed in line with the left/right direction of the child safety seat 2.

Figure 2:
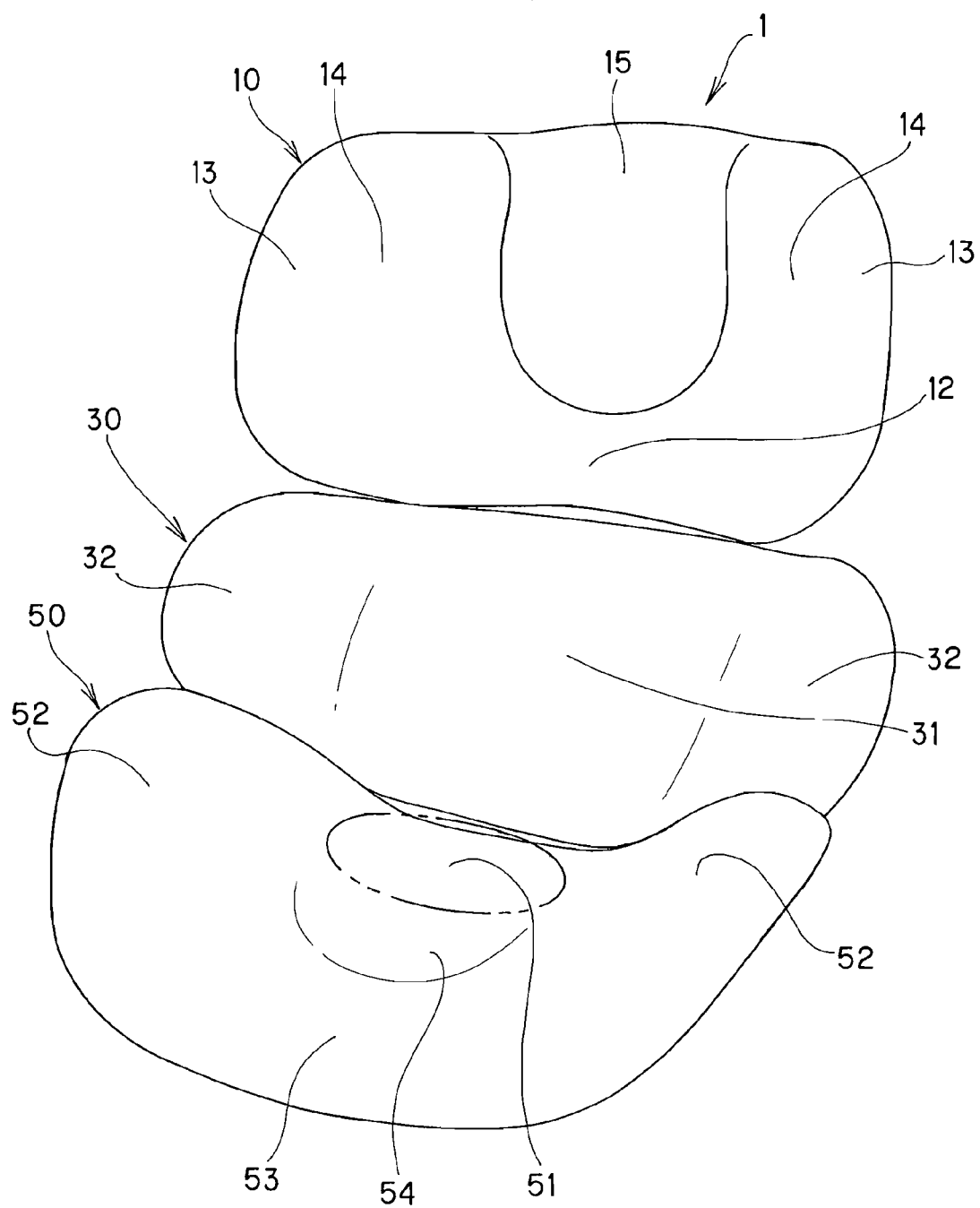
FIG. 2 is a perspective view of the cushion according to the first embodiment of the present invention.
Figure 3:
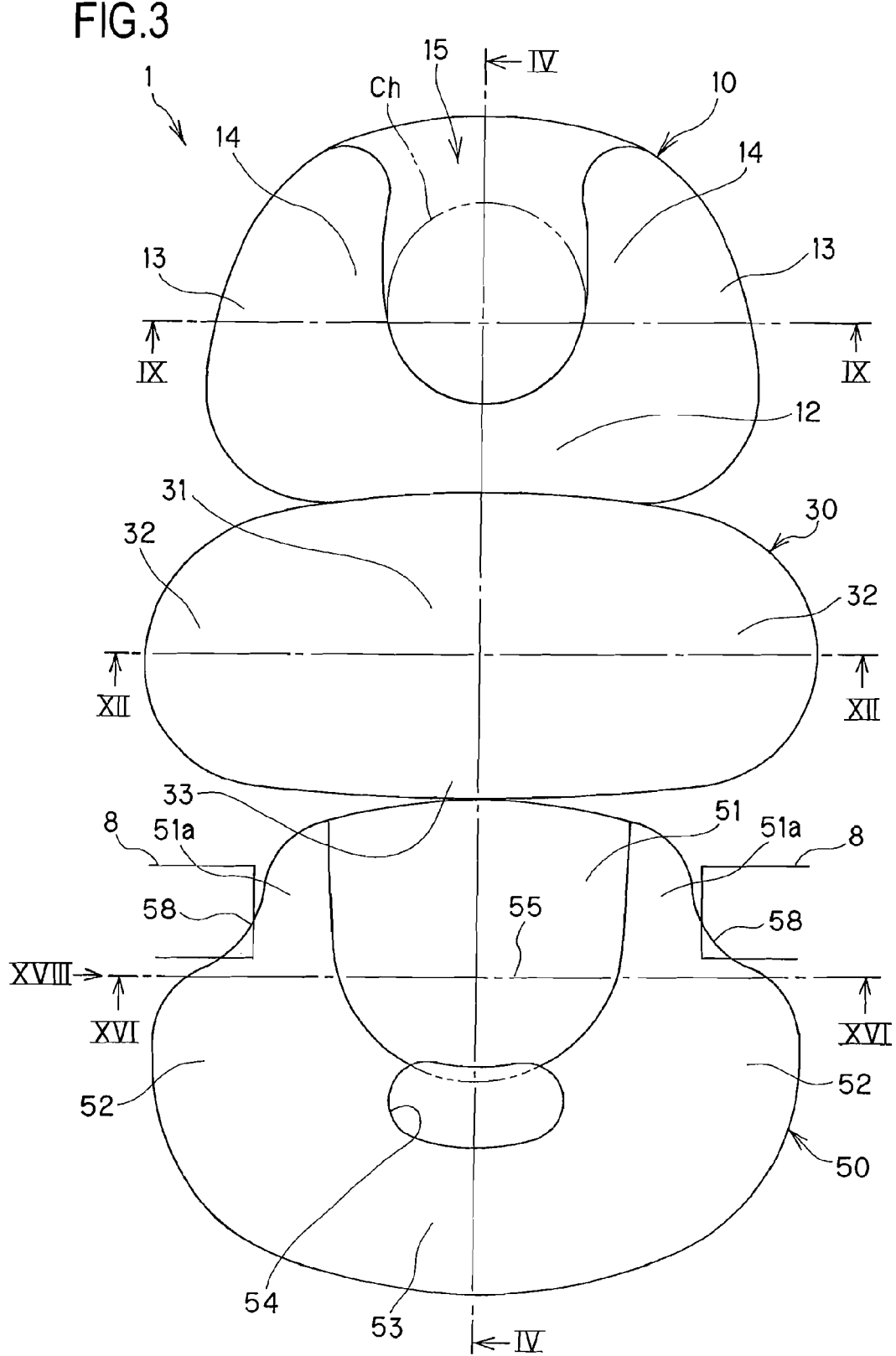
FIG. 3 is a plan view of the cushion.
Figure 4:
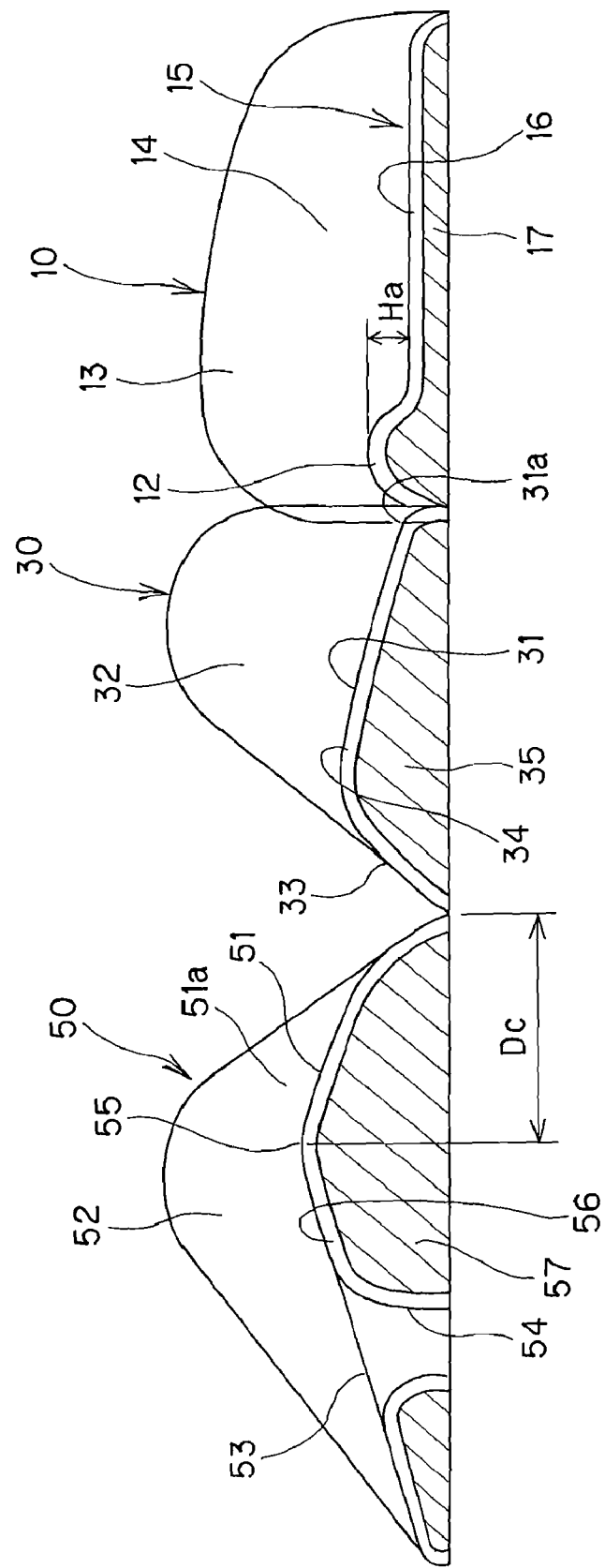
FIG. 4 is a cross-sectional view of the cushion along the IV-IV line in FIG. 3.
Figure 5:
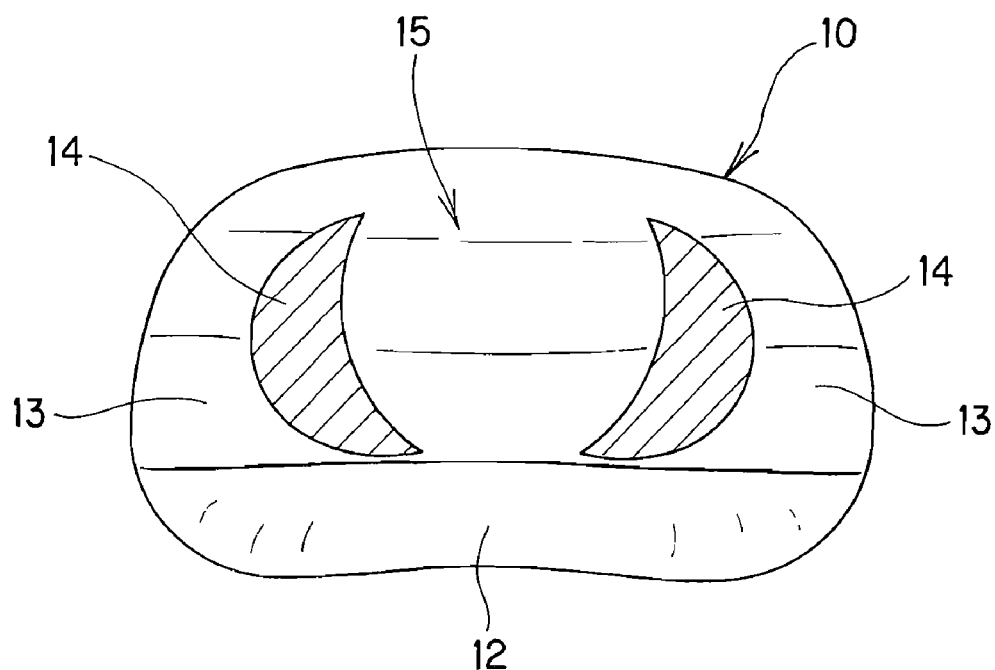
FIG. 5 is a plan view of a head pad.
Figure 6:
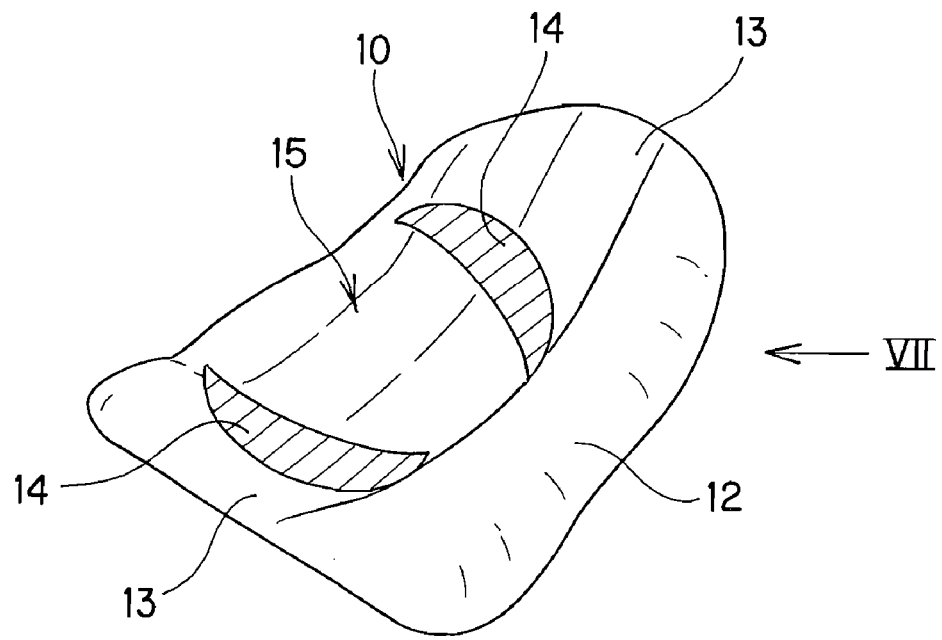
FIG. 6 is a perspective view of the head pad from the lower rim end.

FIG. 2 is a perspective view of the cushion 1; FIG. 3 is a plan view of the cushion 1; and FIG. 4 is a cross-sectional view of the cushion 1 along the IV-IV line of FIG. 3. Furthermore, FIGS. 3 and 4 illustrate the cushion 1 in an arrangement in which the pads 10, 30, 50 are arranged on a plane. The up/down direction of FIG. 4 corresponds to the height directions of the respective pads. In the following, details of the pads will be described in sequence.

Figure 7:
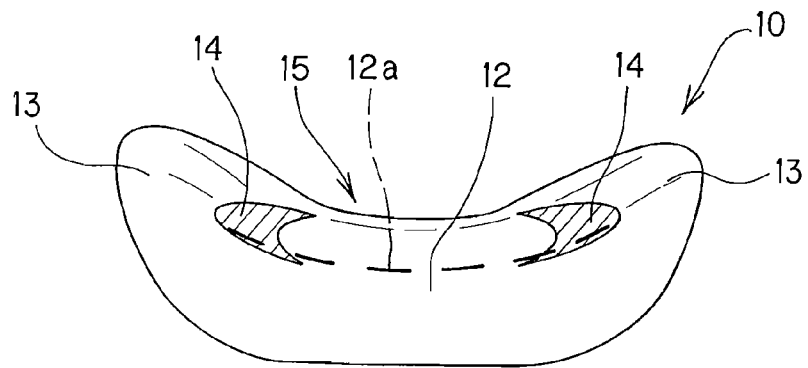
FIG. 7 is a perspective view of the head pad from the direction of the arrow VII in FIG. 6.
Figure 8:
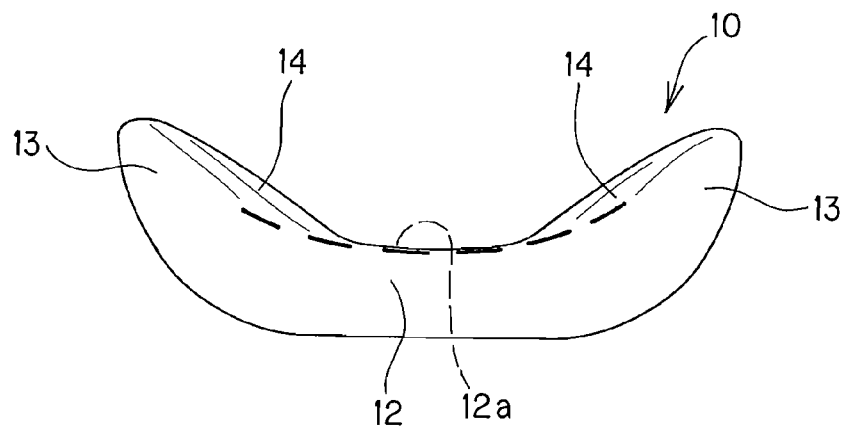
FIG. 8 is a side view of the head pad from the direction of the arrow VII in FIG. 6.
Figure 9:
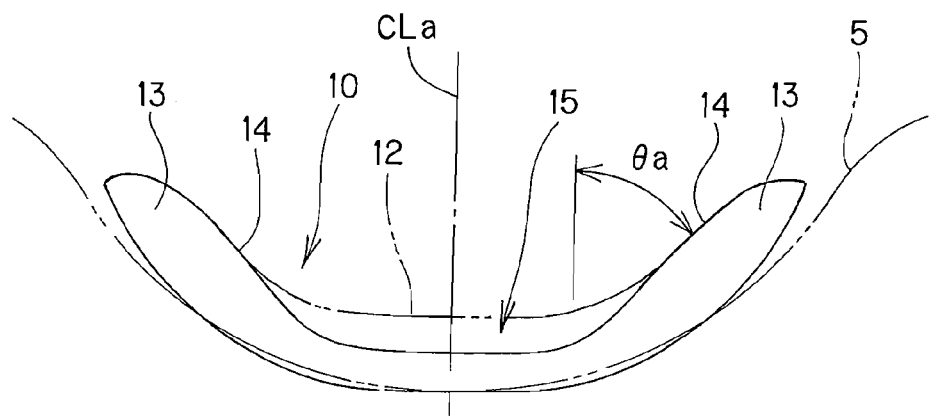
FIG. 9 is a cross-sectional view of the head pad along the IX-IX line.

As shown in FIGS. 2 to 4, and further in FIGS. 5 to 9, the head pad 10 has a rounded outer periphery. On the front side of the head pad 10, a neck supporting portion 12 protruding outwardly along the lower rim of the head pad 10 is formed. The neck supporting portion 12 is employed to support the back neck of the child. As shown in FIGS. 7 and 8, the head pad 10 is shaped to curve more in the front direction (the up direction in FIGS. 7 and 8) at the both left/right end portions than at the central portion, thereby to form a pair of curved portions 13. Accordingly, a pair of head side supporting surfaces 14 (the hatched areas in FIGS. 5 to 7) inclined upwardly toward the both left/right ends of the head pad 10 are formed on the surface of the head pad 10. As illustrated with dashed lines in FIGS. 7 and 8, the ridge line 12a of the neck supporting portion 12 is curved smoothly and concavely in the height direction toward the head side supporting surface 14 from the central portion of the head pad 10 in the left/right direction. No protruded portion exists on the upper rim of the head pad 10. Thus, a recess 15 is formed on the central portion of the head pad 10 in the left/right direction, such that the lower rim of the recess is framed by the neck supporting portion 12, and the both sides thereof are framed by the head side supporting surfaces 14, whereas the upper rim side thereof is open. The recess 15 works as a portion for receiving the head of the child. As illustrated clearly in FIG. 9, the head side supporting surface 14 is inclined with an almost constant inclination in the left/right cross-section of the head pad 10; however, the head side supporting surface 14 is formed in a mortar shape such that the head side supporting surface 14 is bulged more outwardly at the central portion than at the up/down end sides.

The dimensions of the respective portions, such as the height of the neck supporting portion 12, the incline angle of the head side supporting surface 14, or the size of the recess 15 may be set arbitrarily in accordance with the physical size of the child, for which the child safety seat 2 is designed. However, the height of the neck supporting portion 12 is preferably adjusted to the protruding amount of the back of the head with respect to the back neck of the child, and the area of the recess 15 is preferably adjusted to the size of the back of the head. Roughly, the height Ha (see FIG. 4) of the neck supporting portion 12 at the central portion of the left/right direction with respect to the bottom surface of the recess 15 can be set to about 15 mm, the direction normal to the bottom surface of the recess 15, in other words, the incline angle θa of the head side supporting surface 14 (see FIG. 9) relative to the direction of the central line CLa, which divides the head pad 10 into two equal parts in left/right direction, can be set to about 40 to 50 deg. The dimensions of the recess 15 can be set so as to obtain a flat circular area Ch with a diameter of about 100 to 110 mm as shown with a virtual line of FIG. 3.

As shown in FIG. 4, the head pad 10 is constructed to arrange an elastic material having a proper cushioning property as a core member 17 inside a skin member 16. For the skin member 16, material having air permeability like mesh fabric, or material fabricated from a material lacking air permeability such as a textile by opening through holes therein to have enough air permeability may be used. For the core member 17, elastic material, such as cotton, urethane, low repulsive urethane, polymeric gel can be used. Ventilation holes may be formed in the core member 17, or urethane material or the like including connected air bubbles may be used as the core member 17. The core member 17 may be arranged inside the whole surface of the head pad 10, or only inside the neck supporting portion 12. The core member 17 may be omitted underneath the recess 15, whereas the core member 17 may be arranged only inside the neck supporting portion 12 and the curved portion 13.

Figure 10:
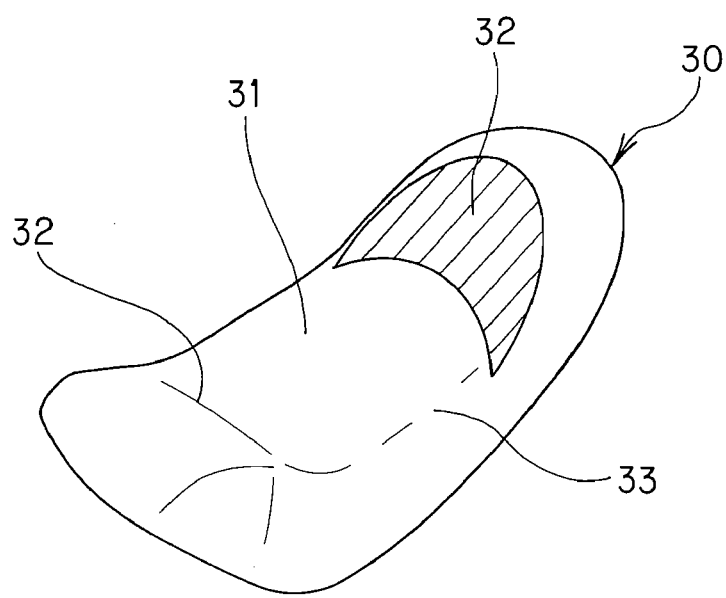
FIG. 10 is a perspective view of a back pad.
Figure 11:
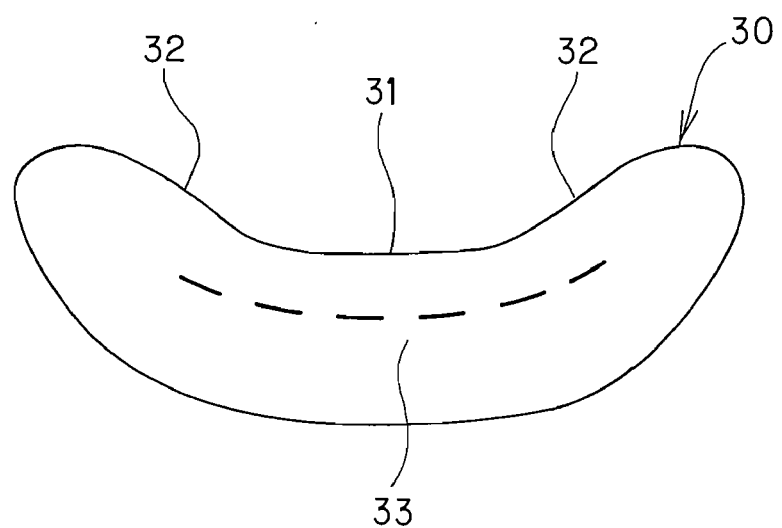
FIG. 11 is a side view of the back pad from the under rim side.
Figure 12:
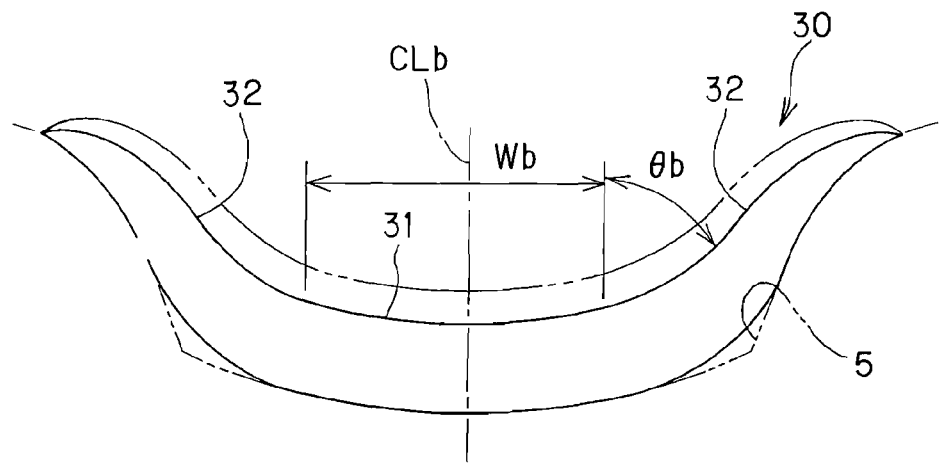
FIG. 12 is a cross-sectional view of the back pad along the XII-XII line in FIG. 3.
Figure 13:
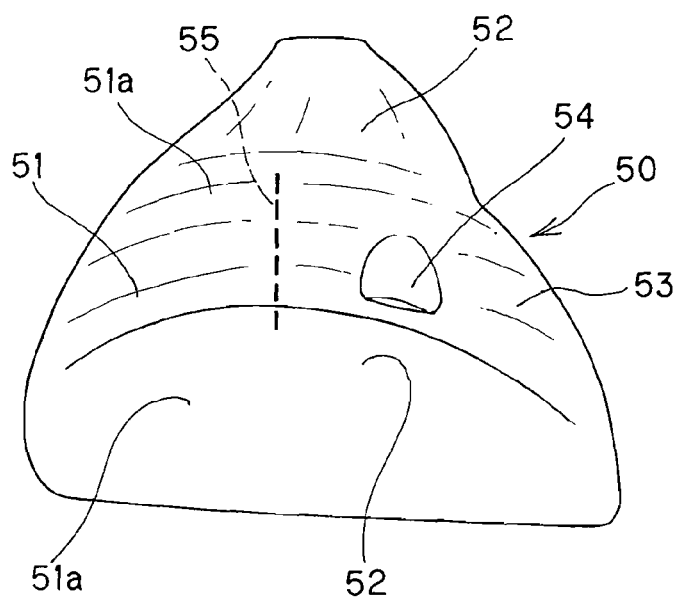
FIG. 13 is a side view of a hip pad from the direction of the arrow XVIII in FIG. 3.
Figure 14:
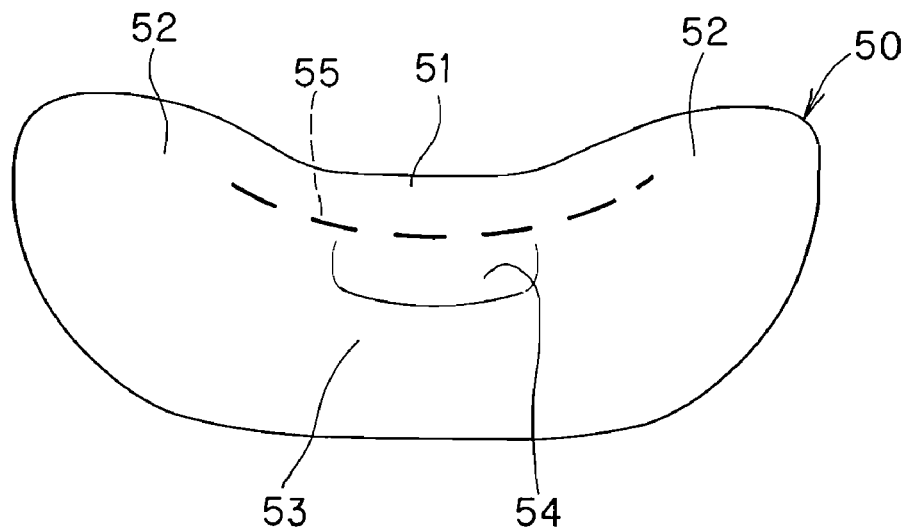
FIG. 14 is a perspective view of the hip pad from the lower rim side.
Figure 15:
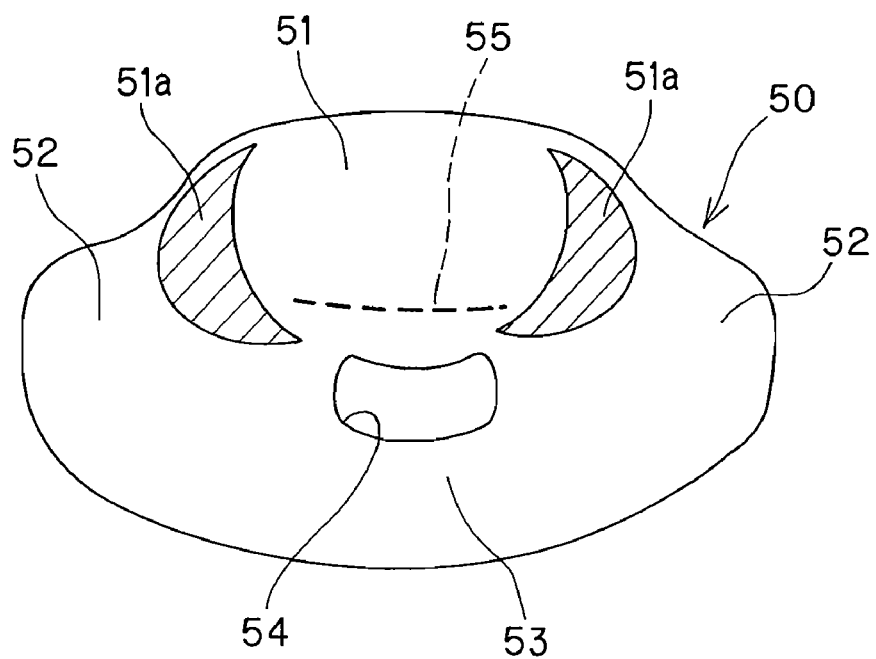
FIG. 15 is a side view of the hip pad.

As shown in FIGS. 2 to 4, and further in FIGS. 10 to 12, the back pad 30 is shaped such that the back pad 30 is curved more toward the front side thereof at the left/right end portion than at the central portion. In FIG. 11, the curve is expressed with a dashed line. As thus curved, a back supporting surface 31 for supporting the back of the child is formed on the central portion of the back pad 30 in the left/right direction, and a pair of body side supporting surfaces 32 (see the hatched areas in FIG. 10) inclined upwardly toward the both ends of the back pad 30 are formed on the both sides of the back supporting surface 31. As illustrated clearly in FIG. 4, the back supporting surface 31 is formed in a shape of a slope surface inclined downwardly from the lower end side toward the upper end side of the lower end of the back pad 30. The height of the upper end 31a of the back supporting surface 31 is lower than that of the neck-supporting portion 12 of the head pad 10. Furthermore, a slope surface 33 inclined upwardly toward the back supporting surface 31 is formed on the end portion of the lower rim side of the back pad 30. The slope surface 33 is employed to avoid the interference between the back pad 30 and the hip pad 50 when the back pad 30 is arranged on the child safety seat 2. Namely, since curved or bended portion exists between the seat portion 5 and the back portion 6 of the child safety seat 2, the rear end of the hip pad 50 could interfere with the lower end of the back pad 30, when the hip pad 50 is arranged on the rear end of the seat portion 5 and the back pad 30 is arranged on the lower end of the back portion 6. Accordingly these pads could not be arranged in continuity. The slope surface 33 is employed to suppress the interference, thereby to arrange the hip pad 50 and the back pad 30 in continuity.

The dimensions of the respective portions of the back pad 30 may be set arbitrarily in accordance with the physical size of the child, for which the child safety seat 2 is designed. However, the curvature of the back pad 30 is preferably set to fit the shape of the curve of the child from the back to the both body sides. Roughly, as shown in FIG. 12, the width Wb of the back supporting surface 31 in the left/right direction can be set to about 140 to 160 mm. The incline angle θb of the body side supporting surface 32 relative to the direction of the central line CLb, which divides the back pad 30 into two equal parts in left/right direction, can be set to about 45 deg. As shown in FIG. 4, the back pad 30 is constructed to arrange an elastic material having a proper cushioning property as a core member 35 inside a skin member 34. Materials for the skin member 34 and the core member 35 may be selected in a similar manner to the skin member 16 and the core member 17 of the head pad 10. The core member 35 may be arranged inside the whole surface of the back pad 30, or only inside a part thereof.

As shown in FIGS. 2 to 4, and further in FIGS. 13 to 16, the hip pad 50 has a hip supporting surface 51 and a pair of knee supporting surfaces 52 inclined upwardly toward the left/right end portion of the hip pad 50. Furthermore, the left end of the hip pad 50 shown in FIG. 13 corresponds to the rear end of the hip pad 50, and the upper end of the hip pad 50 shown in FIG. 15 corresponds to the rear end of the hip pad 50. As illustrated clearly in FIG. 4, the hip supporting surface 51 is inclined upwardly toward the front direction from the rear end of the hip pad 50. Furthermore, as shown with a dashed line in FIG. 14, the hip supporting surface 51 is concavely curved toward the knee supporting surfaces 52 in the height direction from the central portion of the hip pad 50 in the left/right direction. Accordingly, as shown with hatchings in FIG. 15, slope surfaces 51a for supporting both sides of the hip of the child are formed inside the both knee supporting surfaces 52. These slope surfaces 51a are connected smoothly to the knee supporting surfaces 52. As illustrated clearly in FIG. 3, the knee supporting surface 52 is extended a little longer toward the front of the hip pad 50 than the hip supporting surface 51. Accordingly, the hip is supported with the hip supporting surface 51, whereas the knee of the child is received reliably with the knee supporting surface 52.

As illustrated clearly in FIG. 3 and 4, a leg supporting surface 53 is formed on the hip pad in the front of the hip supporting surface 51, and the leg supporting surface 53 extends downwardly inclined toward the front end of the hip pad. In the middle of the leg supporting surface 53, a belt pass-though hole 54, which the crutch belt 7 (see FIG. 1) passes through, is opened. Furthermore, the position of the ridge line 55 defining the boundary between the hip supporting surface 51 and the leg supporting surface 53 may be set arbitrarily in accordance with the required size of the hip supporting surface 51.

Figure 16:
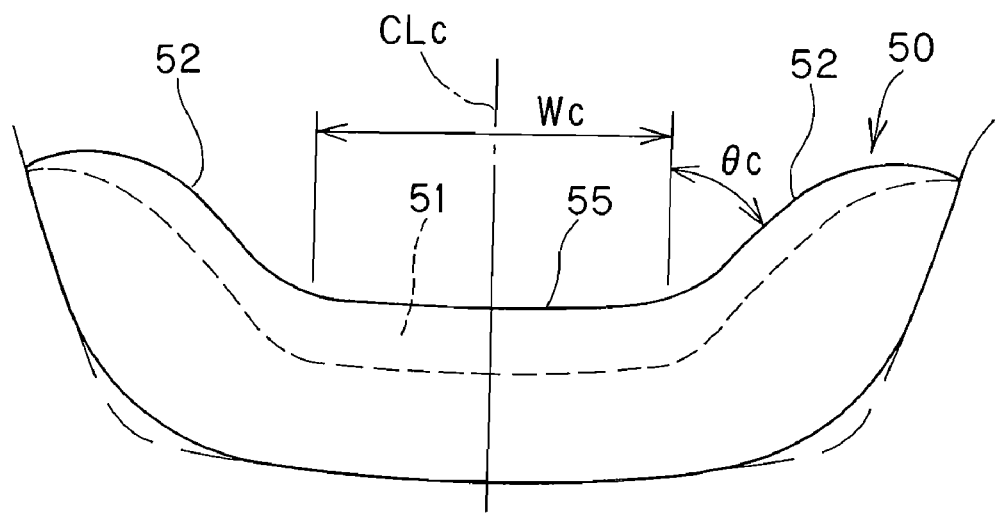
FIG. 16 is a cross-sectional view of the hip pad along the XVI-XVI line in FIG. 3.

The dimensions of the respective portions of the hip pad 50 may be set arbitrarily in accordance with the physical size of the child for which the child safety seat 2 is designed. However, the size of the hip supporting surface 51 is preferably set to fit the hip of the child, more specifically, the surface of the diaper put on the hip of the child. The knee supporting surface 52 is preferably formed such that the knee of the child does not go outside over the knee supporting surfaces 52 in the left/right direction. Roughly, the width Wc (see FIG. 16) of the hip supporting surface 51 in the left/right direction can be set to about 140 mm, and the depth Dc (see FIG. 4) in the front/rear direction can be set to about 80 mm. Furthermore, as shown in FIG. 16, the incline angle θc of the knee supporting surface 52 relative to the direction of the central line CLc, which divides the hip pad 50 into two equal parts in left/right direction, can be set to about 45 deg. Furthermore, as shown in FIG. 4, the hip pad 50 is constructed by arranging an elastic material having a proper cushioning property as a core member 57 inside a skin member 56. Materials for the skin member 56 and the core member 57 may be selected in a similar manner to those of the skin member 16 and the core member 17 of the head pad 10. The core member 57 may be arranged inside the whole surface of the hip pad 50, or only inside a part thereof. Furthermore, as shown in FIG. 3, a retracted portion 58 retracting toward the central portion in the left/right direction is formed on both side ends of the rear end side of the hip pad 50. The retracted portion 58 is employed to run the waist belt 8 of the child safety seat 2 around to the front side of the hip pad 50.

For the cushion 1 having the above-mentioned construction, the hip pad 50 is placed on the seat portion 5; the back pad 30 is placed on the back portion 6 touching with the rear end of the hip pad 50; and the head pad 10 is placed above the back pad 30, as shown in FIG. 1. The crutch belt 7 is inserted through the belt passing hole 54 of the hip pad 50; the waist belt 8 is pulled out from the rear end of the hip pad 50 to the front side of the cushion 1; and the shoulder belt 9 is pulled out from the gap between the back pad 30 and the head pad 10 to the front side of the cushion 1. Thus, the child is seated on the front side of the cushion 1 attached on the seat 2 and restrained with the belts 7, 8, 9.

Figure 17:
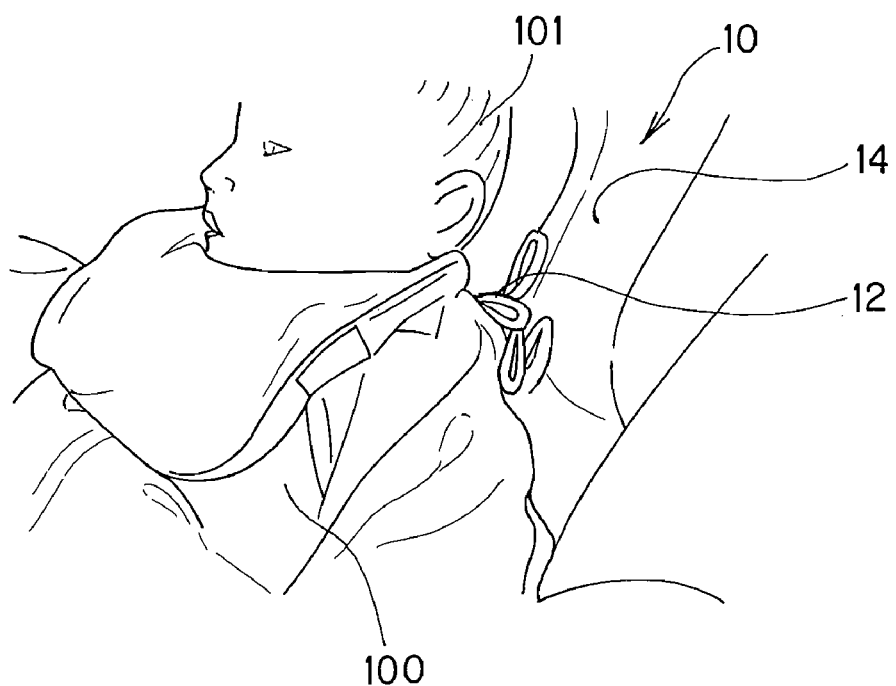
FIG. 17 illustrates how the head of the child is supported with the head pad.
Figure 18:
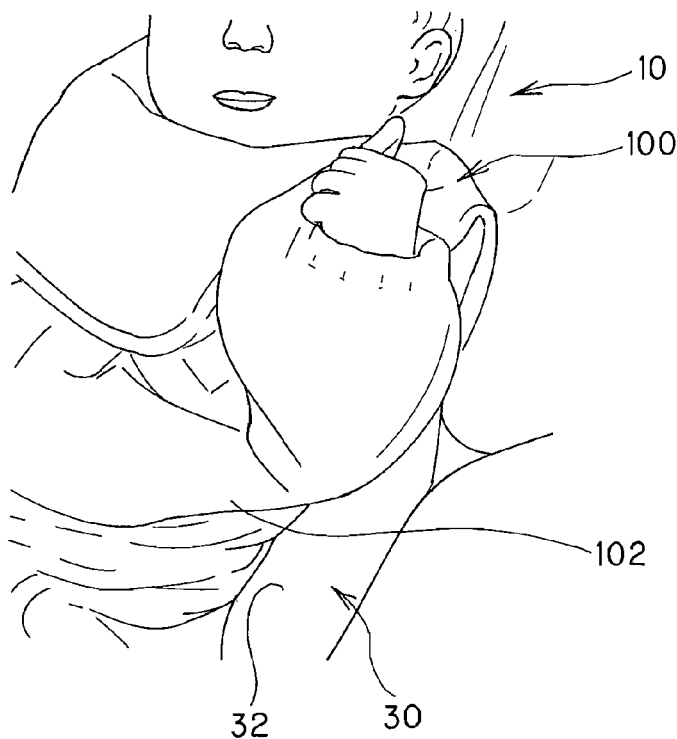
FIG. 18 illustrates how the back and the torso of the child are supported with the back pad.

Next, the operation of the cushion 1 when a child is seated on the child safety seat 2 as mentioned above will be described. The head of the child is received and supported with the recess 15 on the head pad 10. In this position, the neck of the child is supported from the back by bringing the neck-supporting portion 12 of the head pad 10 in contact with the back neck of the child 100, as shown in FIG. 17. Accordingly, the head 10 of the child 100 is held in a posture in which his/her jaw is lifted up a little, thereby to prevent compression of the airway, and to have the child to breathe easily. Furthermore, since the neck supporting portion 12 is curved convexly as shown in FIGS. 7 and 8, the neck of the child 100 can be positioned automatically at the center in the left/right direction. Furthermore, since the head 10 of the child 100 is supported from the both sides with the both head side supporting surfaces 14 of the recess 15, the head 101 is turned automatically on to the front, thereby to prevent side toppling and side slip of the head of the child. These operations are effective, especially for the infant before the infant can hold his/her head erect. Furthermore, the upper rim side of the recess 15 is not framed by the protruded portion, and the upper rim side of the head pad 10 is open, thus, the child feels more liberating.

On the back pad 30, the back of the child is supported with the back supporting surface 31; and the torso 102 is supported from the sides by bringing the body side supporting surfaces 32 into contact with the torso 102 of the child 100 from the outside. Accordingly, the side slip of the body core of the child 100 is prevented. Since the back supporting surface 31 is inclined downwardly from the lower end side of the back pad 30 toward the upper end side of the back pad 30, the back supporting surface 31, especially the lower part of the back supporting surface 31 can be well contacted with the waist of the child from the back, thereby to improve the retention of the posture of the child with the back pad.

Figure 19:
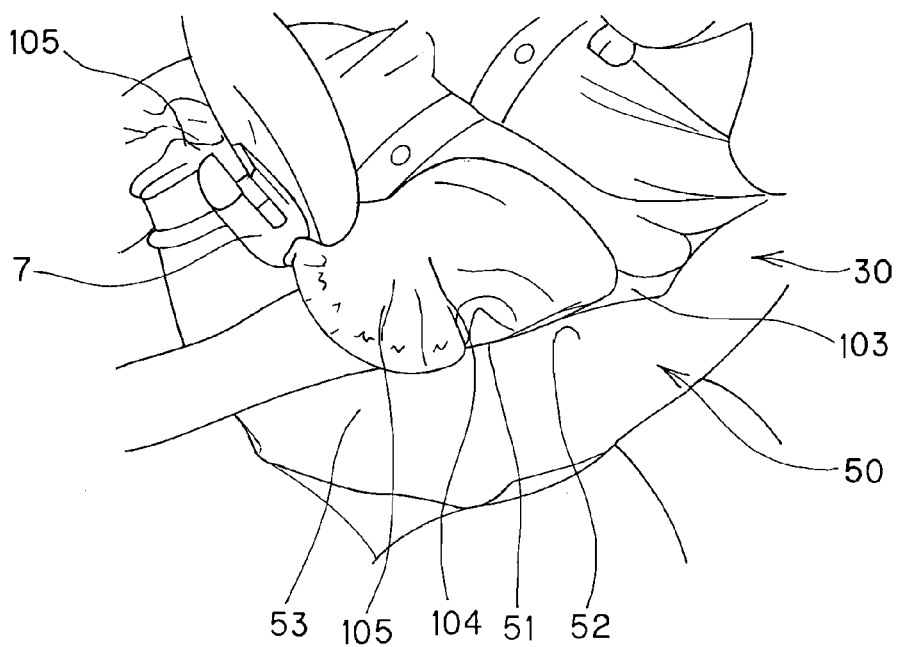
FIG. 19 illustrates 19 how the hip and the knees of the child are supported with the hip pad.

On the hip pad 50, the hip 103 is supported with the hip supporting surface 51 by bringing the hip supporting surface 51 in contact with the hip 103 of the child 100 as shown in FIG. 19. Since the hip supporting surface 51 is inclined upwardly toward the front of the hip pad 50, the forward slip of the hip 103 toward the front of the child safety seat 2 can be suppressed. Accordingly, no bend or compression of the torso due to the forward slip of the hip occurs. Furthermore, the hip supporting surface 51 is contacted with the hip 103 so as to wrap around the hip 103 by bringing the slope surfaces 51a of the curved hip supporting surfaces 51 in contact with the sides of the hip, thereby to improve the retention of the posture of the child with the hip supporting surface 51.

Furthermore, the knees 104 are flexed inward moderately when the knees 104 are supported with the knee supporting surfaces 52 on the hip pad 50 by bringing the knee supporting surfaces 52 in contact with the knees 104 of the child 100 from the outside. Accordingly, the outward rotation of the knee 104 is suppressed, and the lower legs 105 are retained in a proper direction. Thus, the balance of the flexor muscle and the extensor muscle of the lower body of the child 100 remains moderately, thereby to prevent deformation or atrophy of the body. Since the knee supporting surface 52 are extended longer toward the front of the hip pad than the hip supporting surface 51, the knee 104 positioned in the front of the hip 103 can be reliably supported with the knee supporting surface 52, while the hip 103 is supported with the hip supporting surface 51. Furthermore, by supporting the lower leg 105 which is flexed inwardly by the knee supporting surface 52 with the leg supporting surface 53, the lower leg 105 can be stretched in a natural posture toward the front of the hip pad.

Since the head pad 10, the back pad 30 and the hip pad 50 are constructed as separate components, each of which are separable from each other, in the cushion 1 of the present embodiment, these pads 10, 30, 50 can be arbitrarily selected to use in accordance with the growth stage of the child. For an example of using the pads selectively: all of the pads 10, 30, 50 are used in the neonatal stage (2.5 to 7 kg weight); only the head pad 10 is used in the early infancy stage (up to 7 to 9 kg weight); and all of the pads are removed, namely the cushion 1 is not used, in the late infancy stage (over 9 kg weight). Furthermore, other usages can be selected including a usage in which all of the pads are removed in the early neonatal stage; a usage in which only the hip pad 50 is used in the early infancy stage; and a usage in which only any two of the pads are used in the neonatal and infancy stage.

Figure 20:
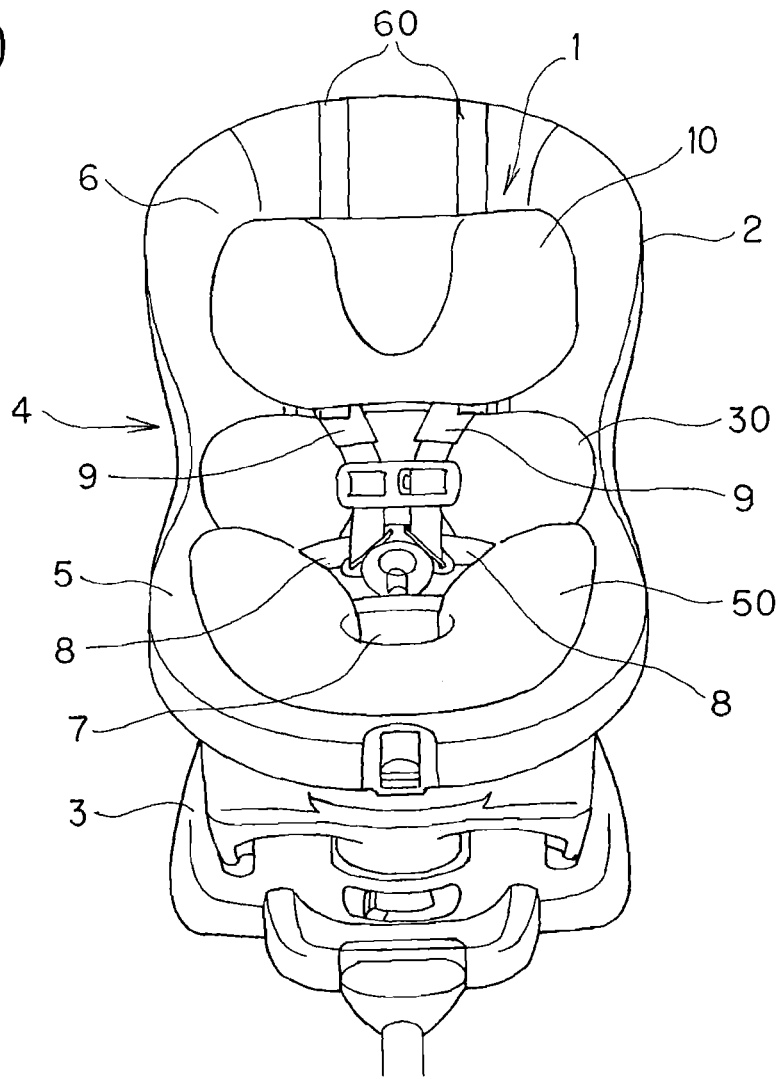
FIG. 20 illustrates an example of the construction of fixing the head pad on the back portion of the child safety seat.
Figure 21:
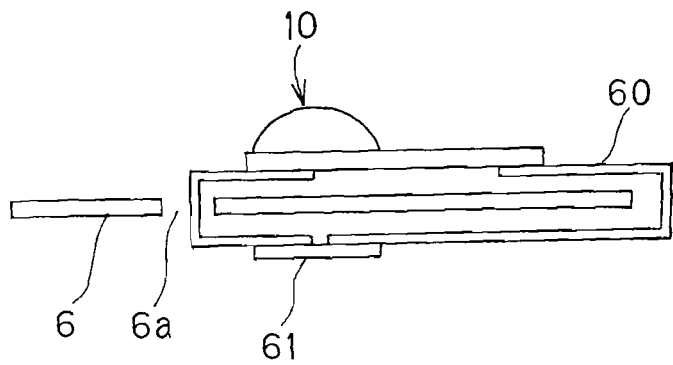
FIG. 21 is a cross-sectional view of the construction of FIG. 20.

Next, FIG. 20 and 21 illustrate an example of the construction of fixing the head pad 10 on the back portion 6. In this example, a pair of fixing belts 60 is secured on the back side of the head pad 10. An end of the respective belt 60 is inserted through a shoulder belt pass-through hole 6a formed on the back portion 6 of the seat main body 4; and the other end of the respective belt 60 runs from the upper end of the back portion 6 around to the read side of the back portion 6. Then, both ends of the respective belt 60 are connected with a connecting tool 61, thereby to form a loop of the belt 60. Furthermore, various coupling means, such as a buckle, surface fasteners, and hooks can be used for the connecting tool 61.

Figure 22:
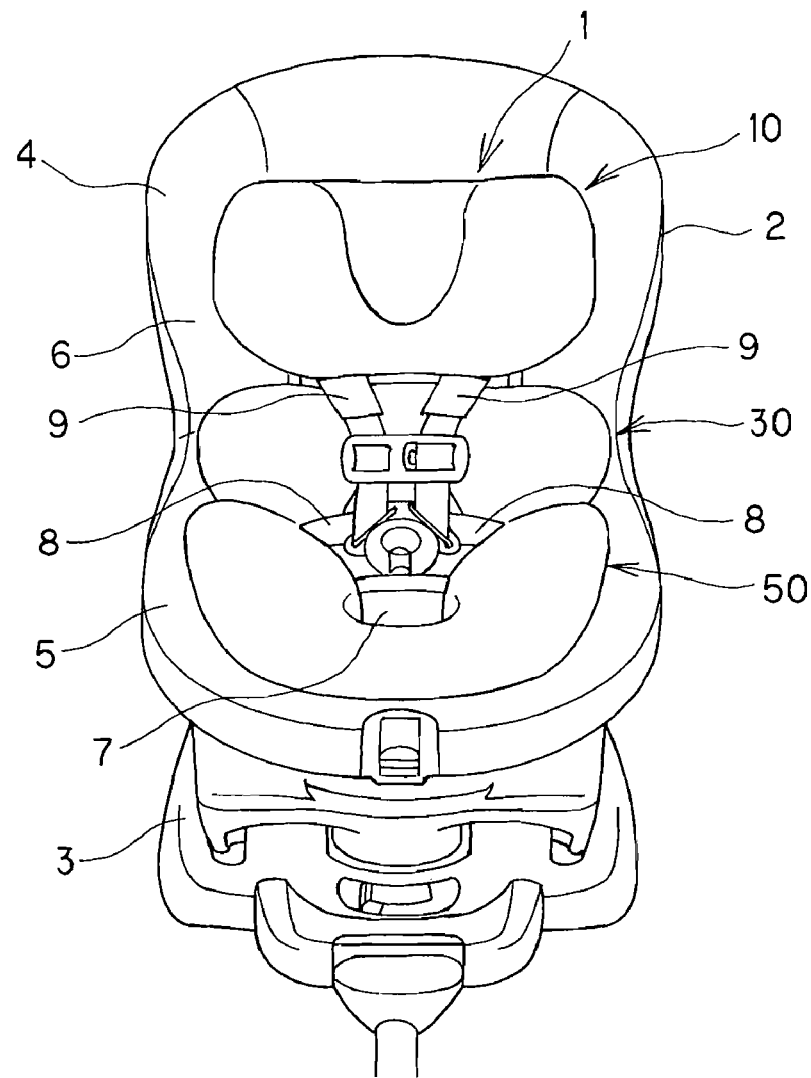
FIG. 22 illustrates another example of the construction of fixing the head pad on the back portion of the child safety seat.
Figure 23:
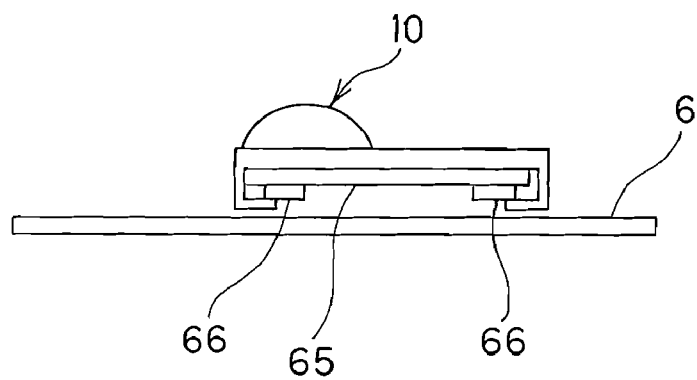
FIG. 23 is a cross-sectional view of the construction of FIG. 22.

FIGS. 22 and 23 illustrate another example of the construction of fixing the head pad 10 to the back portion 6. In this example, a pad base 65 constructed as a separate component from the head pad 10 is arranged on the back side of the head pad 10, and the pad base 65 and the head pad 10 are connected with a connecting tool 66. The pad base 65 may be fixed on the back portion 6 with arbitrary means.

Furthermore, instead of or in addition to the head pad 10, the back pad 30 maybe fixed on the back portion 6 in a similar construction as described above. Furthermore, the position of the head pad 10 may be adjustable along the up/down direction of the back portion 6, and the position of the head pad 10 may be varied in accordance with the height of the head of the child. The same is also applied for the back pad 30. The construction of fixing a pad on a child safety seat is not limited to the above-mentioned examples, and can be modified arbitrarily. For example, each pad can be attached on the cover of the child safety seat or the core member (the cushion member or the base plate) of the child safety seat with arbitrary means, such as hooks, ropes, a buckle, buttons. Furthermore, each pad may be coupled to the child safety seat 2 by connecting any one of the pads with the child safety seat 2 and connecting other pads with the pad. When at least two pads are connected with each other, these pads may be separable or inseparable. In the following, some exemplary constructions of coupling the pads 10, 30, 50 will be described.

FIGS. 24A to 24E illustrate examples of a coupling 70 of connecting the head pad 10 and the back pad 30. In the example of FIG. 24A, a ribbon shape portion 71 is attached to the center of the upper rim of the back pad 30, and surface fasteners 72A, 72B are fixed on the front surface of the ribbon shape portion 71 and the back surface of the head pad 10, respectively. By using these surface fasteners 72A, 72B, the head pad 10 and the back pad 30 is connected. In this example, the position of the head pad 10 can be varied in the up/down direction relative to the back pad 30 by sifting the overlap range, on which the surface fasteners 72A, 72B are overlapped, along the up/down direction of the child safety seat 2. Furthermore, the adjustable range of the position of the head pad 10 may be enlarged by fixing the ribbon shape portion 71 on the back pad 30 adjustably in position in the up/down direction thereof. Since the surface fastener 72B of the head pad 10 contacts with the skin member of the seat 2, the surface fastener 72B is preferably a female type surface fastener having no hook shape projections, in other words, the loop side surface fastener.

In the example of FIG. 24B, a pair of ribbon shape portions 73 is attached to the upper rim of the back pad 30. Hooks 74A are fixed on the front surface of the respective ribbon shape portions, and multiple hooks 74B able to engage with the hooks 74A are fixed with proper spacing along the up/down direction on the positions of the back side of the head pad 10 corresponding to the respective ribbon shape portions 73. In this example, the head pad 10 is coupled with the back pad 30 by engaging the hooks 74A of the back pad 30 with any of the hooks 74B on the head pad 10. Furthermore, the position of the head pad 10 relative to the back pad 30 may be varied in the up/down direction by selecting the hook 74B to be engaged with the hook 74A.

The example of FIG. 24C is common with the example of FIG. 24B in that the head pad 10 and the back pad 30 are coupled by engaging the hooks 74A with the hooks 74B. However, it differs from the example of FIG. 24B in that sliding guides 75 extending along the up/down direction are fixed on the positions of the head pad 10 corresponding to the respective ribbon shape portions 73, and a single hook 74B is fixed position adjustably to the respective sliding guide 75 along the up/down direction. In this example, the position of the head pad 10 relative to the back pad 30 in the up/down direction can be varied by changing the position of the hook 74B on the head pad 10 along the up/down direction.

In the example of FIG. 24D, a pair of the buttons 76 is fixed on the lower rim of the head pad 10; and multiple button holes 77 for passing the button 76 therethrough are formed on the respective pair of ribbon shape portions 73 of the back pad 30 along the up/down direction with spacing. In this example, the head pad 10 and the back pad 30 can be connected by passing the button 76 through any one of the button hole 77. The position of the head pad 10 in the up/down direction of the back pad 30 can be varied by selecting the button hole 77 to be employed.

FIG. 24E illustrates a modification from the FIG. 24A. A cover 78 for covering the surface fastener 72B is added on the back side of the head pad 10. The ribbon shape portion 71 of the back pad 30 can be inserted into the inside of the cover 78 through an opening at the lower end of the cover 78. In this example, since the surface fastener 72B is not exposed on the back surface of the head pad 10, the surface fastener 72B may be a male type surface fastener having hook shape projections. Furthermore, in the examples of FIGS. 24A to 24E, the pads 10 and 30 can be coupled in a similar manner, even if the parts fixed on the head pad 10 and the back pad 30 may be exchanged each other.

Figure 25A:
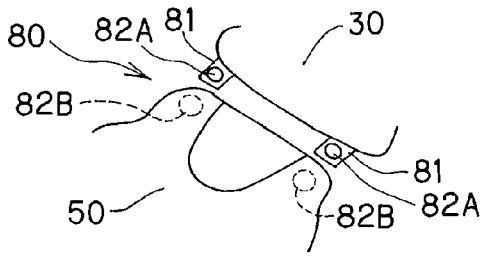
FIG. 25A illustrates an example of coupling the back pad and the hip pad with the hooks.
Figure 25B:
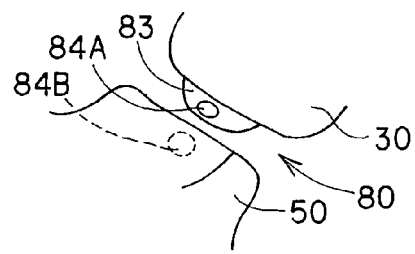
FIG. 25B illustrates an example of coupling the back pad and the hip pad with the surface fasteners.
Figure 25C:
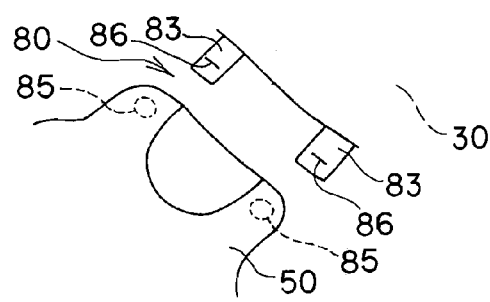
FIG. 25C illustrates an example of coupling the back pad and the hip pad with the button.

FIGS. 25A to 25C illustrate examples of a coupling 80 for coupling the back pad 30 and the hip pad 50. FIG. 25A illustrates an example of coupling the pads 30 and 50 by engaging the hooks 82A fixed on a pair of ribbon shape portions 81 of the lower rim of the back pad 30 with the hook 82B fixed on the back side of the hip pad 50. FIG. 25B illustrates an example of coupling the pads 30 and 50 by overlapping the surface fastener 84A fixed on the ribbon shape portion 83 attached to the center of the lower rim of the back pad 30 with the surface fastener 84B fixed on the back side of the hip pad 50. FIG. 25C illustrates an example of coupling the pads 30 and 50 by inserting the button 85 fixed on the back side of the hip pad 50 through the button hole 86 formed on the ribbon shape portion 81 of the back pad 30. Furthermore, in the examples of FIGS. 25A to 25C, the parts fixed on the head pad 10 and the back pad 30 may be exchanged each other. In the example of FIG. 25B, the surface fastener 84B is preferably the female type surface fastener.

Figure 26A:
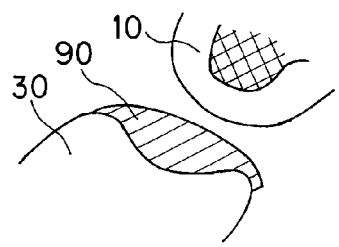
FIG. 26A illustrates an example of arranging a cover covering the coupling of the head pad and the back pad.
Figure 26B:
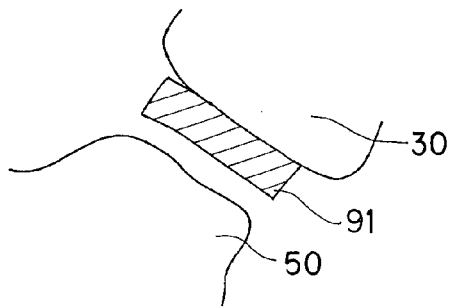
FIG. 26B illustrates an example of arranging a cover covering the coupling of the back pad and the hip pad.

FIGS. 26A and 26B illustrate examples of extending the covers 90, 91 covering the respective couplings 70, 80 outwardly from the upper/lower rim of the back surface of the back pad 30. Since no gap is formed in the coupling part of the pads 10, 30, 50 when these covers 90, 91 are employed, the cushion 1 can achieve as close effect of retaining the posture of the child or cushioning effect as the cushion formed in a unit, despite the cushion 1's divided structure.

In the above-mentioned embodiments, each of the pads is constructed as a separate member, and the pads are coupled with each other; however, these pads may be constructed as a substantially single component, for example, by forming the core members of at least two pads in a single unit.

Second Embodiment

Figure 27:
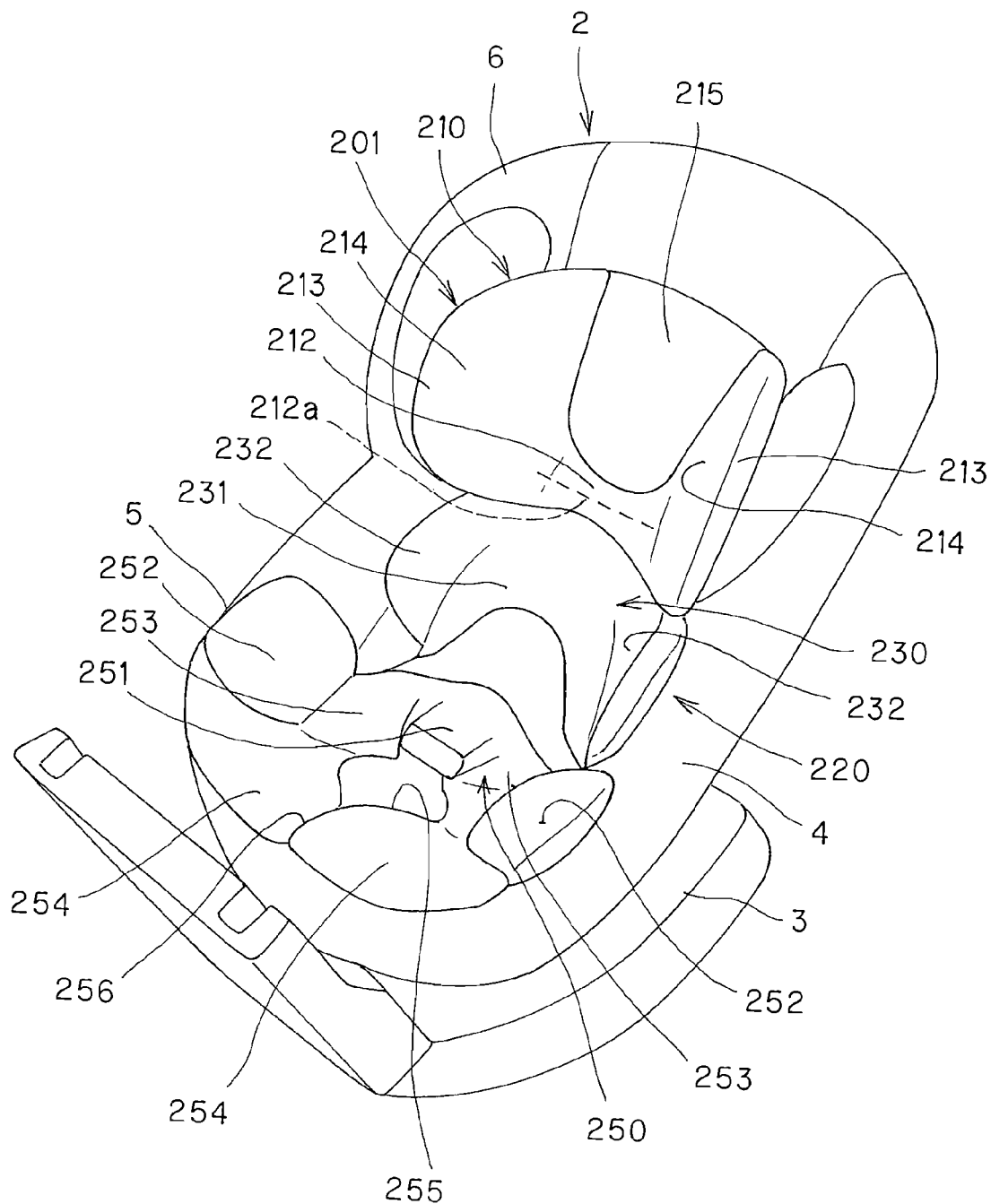
FIG. 27 is a perspective view of a cushion according to a second embodiment of the present invention attached on a child safety seat.
Figure 28:
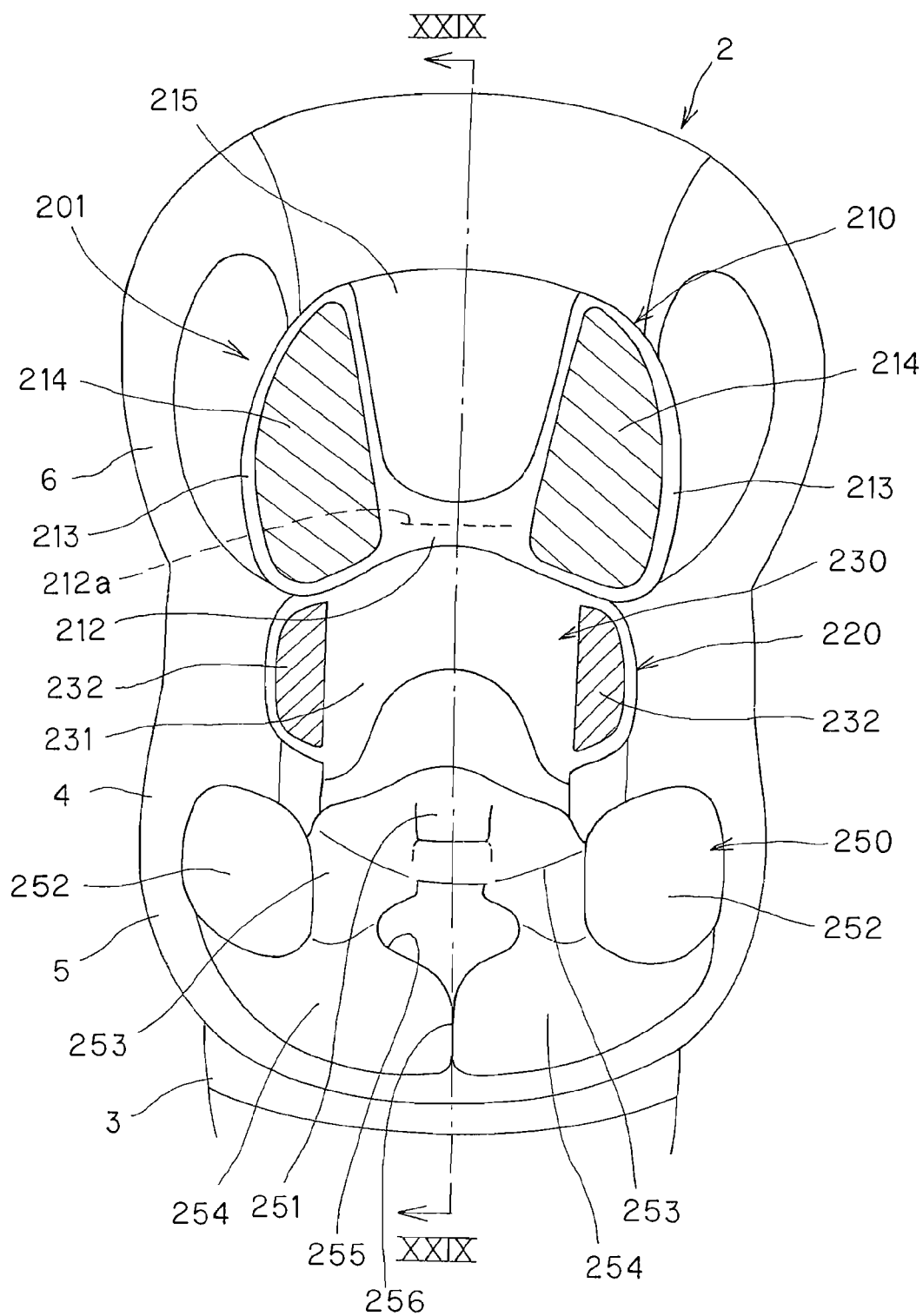
FIG. 28 is a front view of a child safety seat to which a cushion according to the second embodiment of the present invention is attached.
Figure 29:
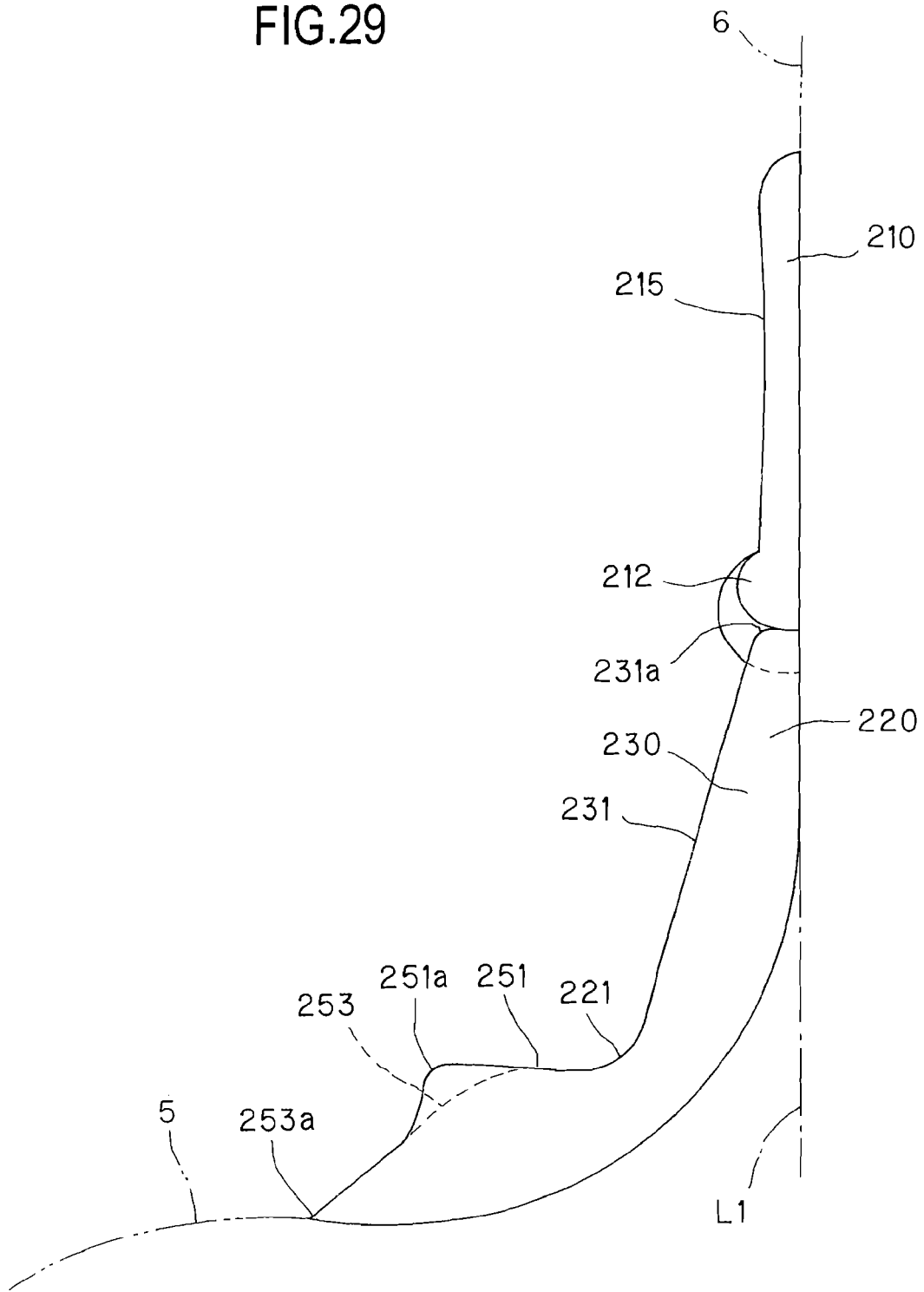
FIG. 29 is a cross-sectional view of the cushion of the second embodiment along the longitudinal central line.

Next, with reference to FIGS. 27 to 34, a cushion suitable for a child safety seat according to a second embodiment of the present invention will be described. FIG. 27 is a perspective view of a cushion 201 according to the second embodiment attached on a child safety seat 2; and FIG. 28 is a front view of the cushion 201 attached on the child safety seat 2. Furthermore, FIG. 29 is a cross-sectional view of the main part of the cushion 201 attached on the child safety seat 2 along a longitudinal central line (corresponds to the XXIX-XXIX line in FIG. 28). Furthermore, the child safety seat 2 is same as that of the first embodiment.

The cushion 201 has a head pad 210 and a hybrid pad 220. The head pad 210 and the hybrid pad 220 are constructed as separate components, each of which is separable from each other. The hybrid pad 220 is constructed as a pad shape component in a single unit which fits the curve shape of the seat cushion 2 from the back portion 6 to the seat portion 5, a back pad 230 is formed on the side of the back portion 6 from the curved portion, and a hip pad 250 is formed on the side of the seat portion 5 from the curved portion (see FIG. 29).

The head pad 210 is employed on the back portion 6 to support the head of the child; the back pad 230 is employed to support the back of the child; the hip pad 250 is employed to support the hip of the child. The shape of the back side of the respective pad 210, 230, 250, namely, the side to be fit to the child safety seat 2, is set to fit the surface shape of the area on which the cushion 1 of the child safety seat 2 is placed. Furthermore, in the following, the up/down directions of the head pad 210 and the back pad 230 are distinguished in line with the up/down direction of the back portion 6; and the up/down direction of the hip pad 250 is distinguished in line with the up/down direction of the seat portion 5. The left/right direction of the pads 210, 230, 250 is expressed in line with the left/right direction of the child safety seat 2.

On the front side of the head pad 210 (the upper side in FIG. 29), a neck supporting portion 212 (see FIG. 29) for supporting the back neck of the child is formed protruding outwardly along the lower rim of the head pad 210. Furthermore, the head pad 210 is curved along the left/right direction such that a pair of curved portions 213 bulging more in the front side at the left/right end portions than at the central portion is formed. Accordingly, a pair of head side supporting surfaces 214 (the hatched areas in FIG. 28) inclined upwardly toward the left/right end of the head pad 210 are formed on the surface of the head pad 210. The ridge line 212a of the neck supporting portion 212 (see FIG. 27) is curved smoothly and concavely in the height direction toward the head side supporting surface 214 from the central portion of the head pad 210 in the left/right direction, similar to the neck supporting portion 12 of the first embodiment. No protruded portion exists on at least the central portion of the upper rim of the head pad 210. Thus, a recess 215 is formed on the central portion of the head pad 210 in the left/right direction, such that the lower rim of the recess is framed by the neck supporting portion 212, and the both sides are framed with the head side supporting surfaces 214, whereas the upper rim side thereof is open. The recess 215 works as a portion receiving the head of the child. Furthermore, the head side supporting surface 214 may be inclined with a constant inclination, or be formed in a mortar shape.

The dimensions of the respective portions of the head pad 210 may be set arbitrarily in accordance with the physical size of the child, for which the child safety seat 2 is designed. For example, the same dimensions can be selected as those of the first embodiment. Furthermore, the head pad 210 may be constructed by arranging a core member made of an elastic material inside a skin member similar to the head pad 10 of the first embodiment. The core member may be arranged inside the whole body of the head pad 210 or only inside a part of the head pad 210, for example, inside the neck supporting portion 212, behind the head side supporting surface 214, or the both.

The back pad 230 has a near flat back supporting surface 231 for receiving the back of the child and a pair of body side supporting surfaces 232 (the hatched areas in FIG. 28) inclined upwardly from the left/right ends of the back supporting surface 231 toward the left/right ends of the back pad 230. As illustrated clearly in FIG. 29, the back supporting surface 231 is formed in a shape of a slope surface inclined downwardly from the lower end side of the back pad 230 with respect to the surface of the back portion 6 or the extension line L1 of the surface, namely, the boundary side to the hip pad 250 to the upper end side. The height of the upper end 231a of the back supporting surface 231 from the surface of the seat portion 6 is lower than the height of the neck supporting portion 212 of the head pad 210 from the surface of the seat portion 6. Furthermore, the dimensions of the back pad 230 may be set arbitrarily in accordance with the physical size of the child, for which the child safety seat 2 is designed; however, the same dimensions may be, for example, selected as those of the first embodiment.

The hip pad 250 has, on its front surface side, a hip supporting surface 251 formed on the center of the hip pad 250 in the left/right direction, a pair of knee supporting surfaces 252 formed outside the left/right ends of the hip supporting surface 251 and inclined downwardly toward the left/right end of the hip pad 250, and a pair of leg supporting surfaces 253 extending outwardly toward the front of the hip pad 250 from between the hip supporting surface 251 and the knee supporting surface 252. The hip supporting surface 251 is inclined upwardly from the rear end side of the hip pad 250 with respect to the front surface of the seat portion 5, namely, the boundary side to the back pad 230 toward the front end side. The rear end of the hip supporting surface 251 and the lower end of the back supporting surface 31 are connected smoothly via the curved portion 221. The leg supporting surface 253 is extended downwardly from the front side of the hip supporting surface 251 with respect to the surface of the seat portion 5, more specifically, the middle or forwarder position of the hip supporting surface in the front/rear direction 251 toward the front rim of the hip pad 250, and their front end 253a is further extended forwardly than the front end 251a of the hip supporting surface 251 (see FIG. 29). Furthermore, in this embodiment, the direction of the inclination is specified with respect to the surface of the seat portion 5; however, the inclination can be specified with respect to the back surface of the hip pad 250, it is inclined upwardly when the dimension from the back surface to the front surface of the hip pad, namely, the thickness of the hip pad 250 increases, whereas it is inclined downwardly when the thickness decreases.

Furthermore, a pair of the leg receiving surfaces 254 is formed on the hip pad 250 connecting with the front ends of the knee supporting surface 252 and the leg supporting surface 253 and inclined upwardly up to the front rim of the hip pad 250. A belt passing hole 255 for passing the crutch belt 7 (see FIG. 1) of the child safety seat 2 through the hip pad 250 in the thickness direction is formed between the leg supporting surface 253 and the leg receiving surface 254. Furthermore, the leg receiving surface 254 is split into the left/right parts with a slit 256 passing through out the hip pad 250 from the belt passing hole 255 to the front rim of the hip pad 250. It is noted that the leg receiving surface 254 is not shown in FIG. 29.

The above-mentioned hybrid pad 220 may be constructed similarly to the head pad 210, by arranging a core member inside the skin member. The core member may be arranged inside the whole body or only a part of the hybrid pad 220. In the following, an example of the core member applied to hybrid pad 220 will be described with reference to FIGS. 30 to 34.

Figure 30:
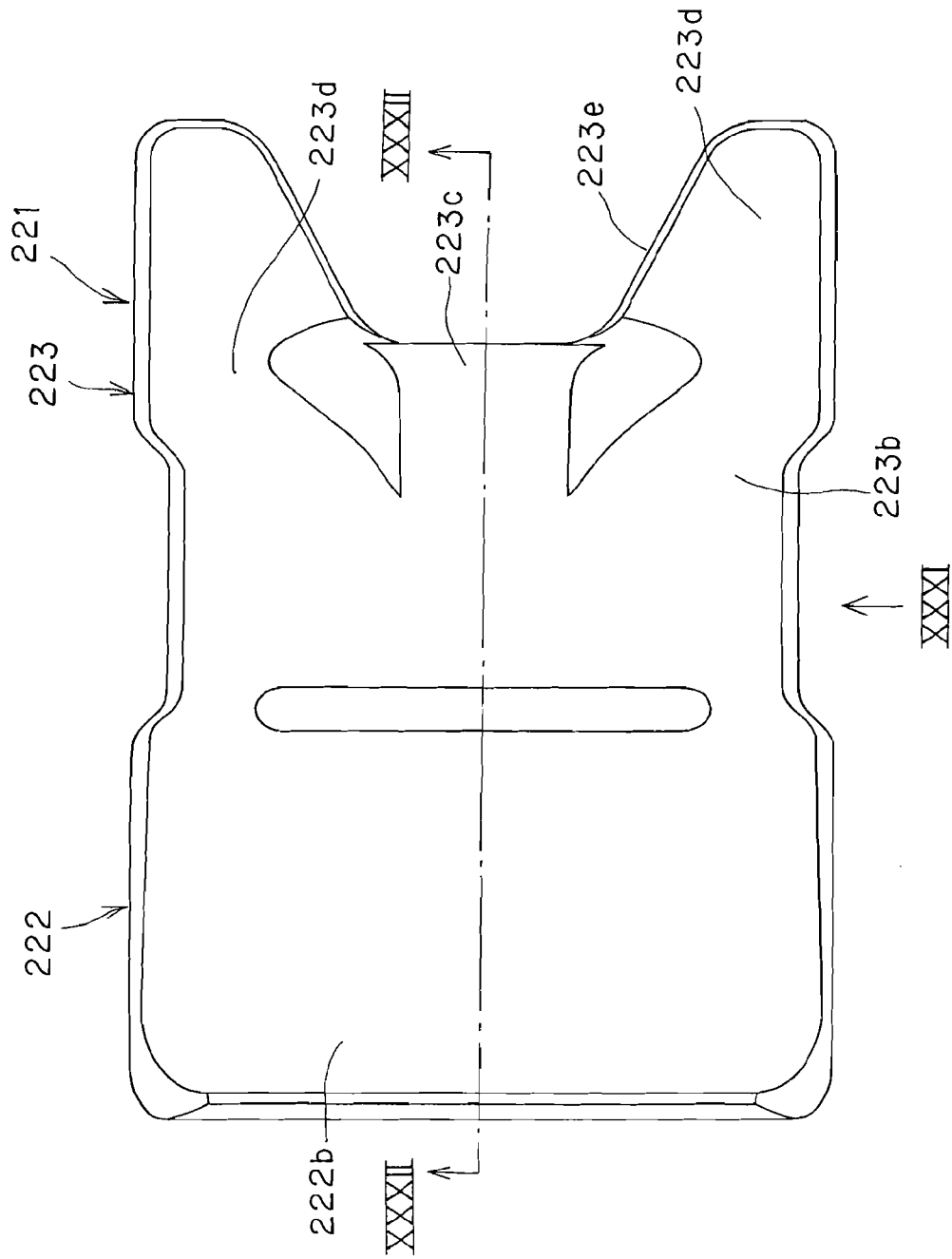
FIG. 30 is a plan view of the core member applied to the cushion of the second embodiment.
Figure 31:
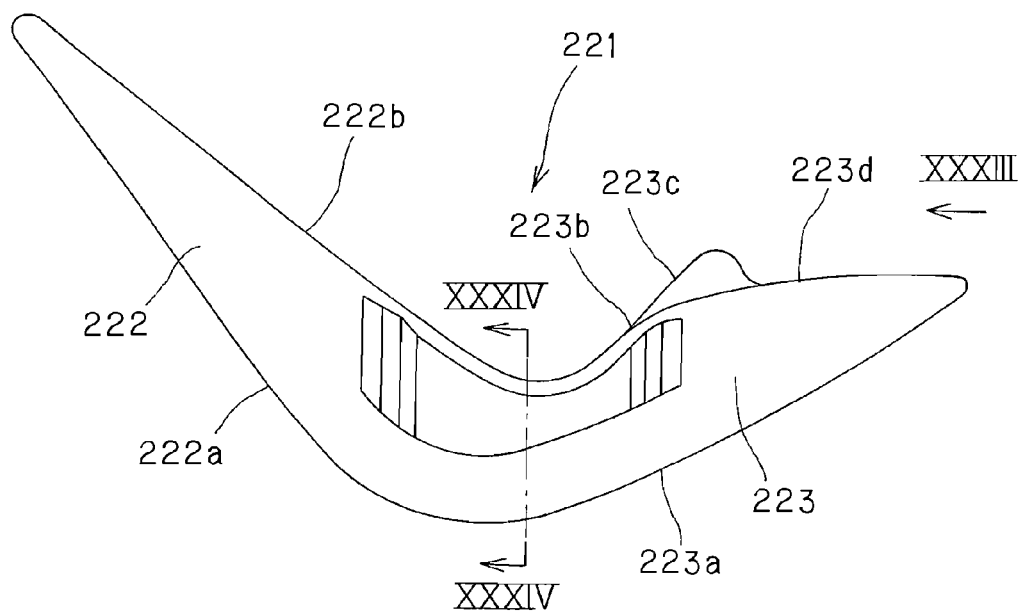
FIG. 31 is a side view of the core member from the direction of the arrow XXXI in FIG. 30.
Figure 32:
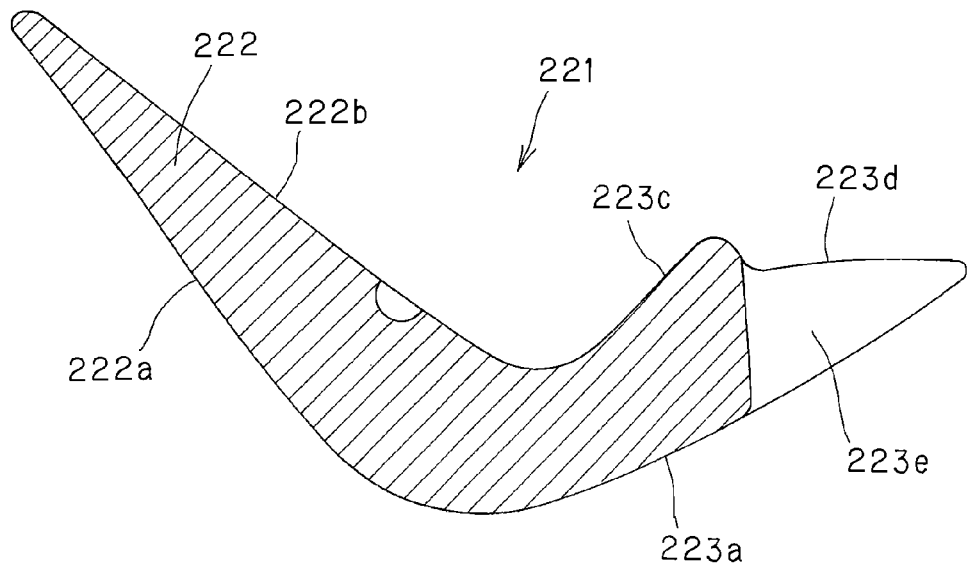
FIG. 32 is cross-sectional view of the core member along the XXXII-XXXII line.
Figure 33:
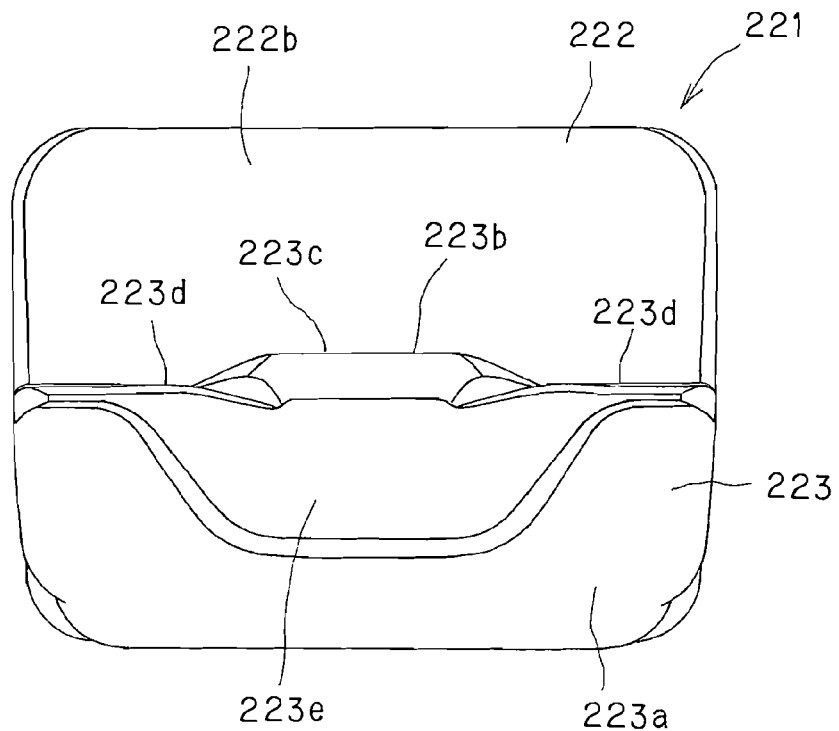
FIG. 33 is a front view of the core member from the direction of the arrow XXXIII in FIG. 31.
Figure 34:
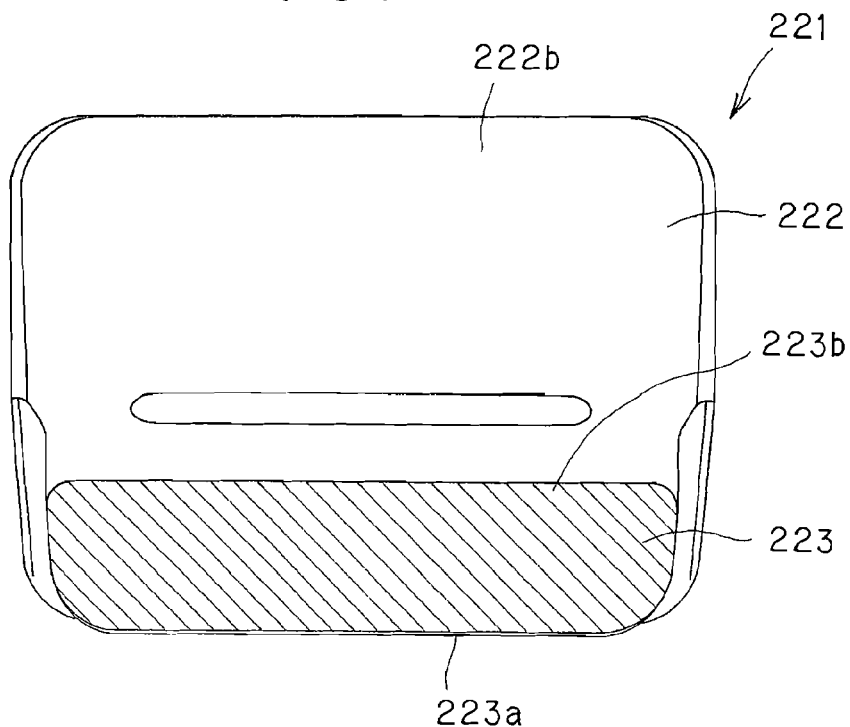
FIG. 34 is a cross-sectional view of the core member along the XXXIV-XXXIV line in FIG. 31.

FIG. 30 is a plan view of the core member, FIG. 31 is a side view of the core member from the direction of the arrow XXXI in FIG. 30; FIG. 32 is a cross-sectional view of the core member along the XXXII-XXXII line in FIG. 30; FIG. 33 is a front view of the core member from the direction of the arrow XXXIII in FIG. 31; and FIG. 34 is a cross-sectional view of the core member along the XXXIV-XXXIV line in FIG. 31. Furthermore, the hybrid pad 220 is drawn in FIG. 29 such that the hip pad 250 is positioned in the left of the back pad 230, whereas the core member 221 is drawn in FIGS. 30 to 32 such that the hip pad 250 is positioned in the right of the back pad 230. The core member 221 is employed as a core to prevent the deformation of the hybrid pad 220 due to its own weight and to provide enough stiffness to the hybrid pad 220 to retain its own shape. The core member 221 is preferably made of plastic material such as urethane. The hybrid pad 220 is constructed by covering the core member 221 arbitrarily with a skin member (the portion composing the front skin of the pad 220 in FIGS. 27 and 28).

As shown in FIGS. 30 to 34, the core member 221 includes a back core 222 and a hip core 223. The back core 222 works as a core of the back pad 230; and the hip core 223 works as a core of the hip pad 250. The back surfaces 222a, 223a of the core 222, 223 are formed in shapes which fit closely to the surfaces of the back portion 6 and the seat portion 5 of the child safety seat 2. The back core 222 is formed in getting gradually thinner from the lower end side (the boundary side to the hip core 223) toward the upper end side. A near flat and near rectangular back supporting surface forming portion 222b for forming the back supporting surface 231 of the back pad 230 is formed on the front surface of the back core 222, the dimensions of the back supporting surface forming portion 222b is equal to the dimensions of the back supporting surface 231 of the back pad 230. In the back core 222, no portion exists corresponding to the body side supporting surface 232 of the back pad 230. Namely, the back core 222 is employed as a core to retain the flat shape of the back supporting surface 231. Different core members from the core member 221 may be arranged beneath a part of the body side supporting surface 232 of the back pad 230, or only the skin member may be employed. When the core member is arranged beneath the part of the body side supporting surface 232, the material therefor may be same as that of the core member 221, or a different material from the core member 221, for example, a material having a cushioning property.

On the other hand, the hip core 223 is employed to form the hip supporting surface 251 and the leg supporting surface 253 of the hip pad 250. Namely, a hip supporting surface forming portion 223c for forming a hip supporting surface 251 and a pair of leg supporting surfaces forming portions 223d for forming the leg supporting surfaces 253 are formed on the surface 223b of the hip core 223. The hip supporting surface forming portion 223c is inclined upwardly from the rear end side toward the front end side thereof with respect to the back surface 223a of the hip core 223. On the contrary, the leg supporting surface forming portion 223d is inclined downwardly from the rear end side toward the front end side thereof with respect to the back surface 223a of the hip core 223.

Furthermore, the leg supporting surface forming portion 223d is rounded a little. A recess 223e for forming the belt passing hole 255 is formed between the leg supporting surface forming portions 223d. In the hip core 223, no portion exists corresponding to the knee supporting surface 252 and the leg receiving surface 254 of the hip pad 250. Namely, the hip core 223 is employed as a core to retain the specific shapes of the hip supporting surface 251 and the leg supporting surface 253. Different core member from the core member 221 may be arranged beneath a part of the knee supporting surface 252 and the leg receiving surface 254 of the hip pad 250, or only the skin member may be employed. When the core member is arranged beneath a part of the knee supporting surface 252 and the leg receiving surface 254, the material therefor may be same as that of the core member 221, or a different material from the core member 221, for example, a material having a cushioning property.

According to the cushion 201 having the above-mentioned construction, the head of the child can be supported in a proper posture with the neck supporting portion 212, the head side supporting surfaces 214 and the recess 215 formed on the head pad 210 similarly to the head pad 10 of the first embodiment. Furthermore, the torso of the child can be supported with the back supporting surface 231 and the body side supporting surfaces 232 formed on the back pad 230 similarly to the back pad 30 of the first embodiment. Furthermore, the forward slip of the hip of the child can be suppressed with the hip supporting surface 251 formed on the hip pad 250; the lower legs of the child van be retained in a proper orientation with the knee supporting surface 252; the lower legs of the child can be stretched in a natural posture with the supporting surface 253 toward the front of the hip pad. Since the leg receiving surface 254 inclined upwardly is formed in the front of the leg supporting surface 253, the legs of the child extending toward the front of the hip pad can be reliably received and retained therewith. Since the rear end of the leg supporting surface 254 is extended longer toward the rear end side of the hip pad 250 than the front end 251a of the hip supporting surface 251, the thigh of the child extending from the hip and supported by the hip supporting surface 251 can be guided more naturally to the leg supporting surface 253.

Furthermore, in the second embodiment, the head pad 210 and the hybrid pad 220 may be connectable and removable with each other. The connecting structures therefor may be arbitrarily selected from the various connecting structures described in the first embodiment. Furthermore, the back pad 230 and the hip pad 250 are constructed in a unit in the second embodiment; however, these pads may be constructed as separate components, each of which is separable from each other.

Third Embodiment

Figure 35:
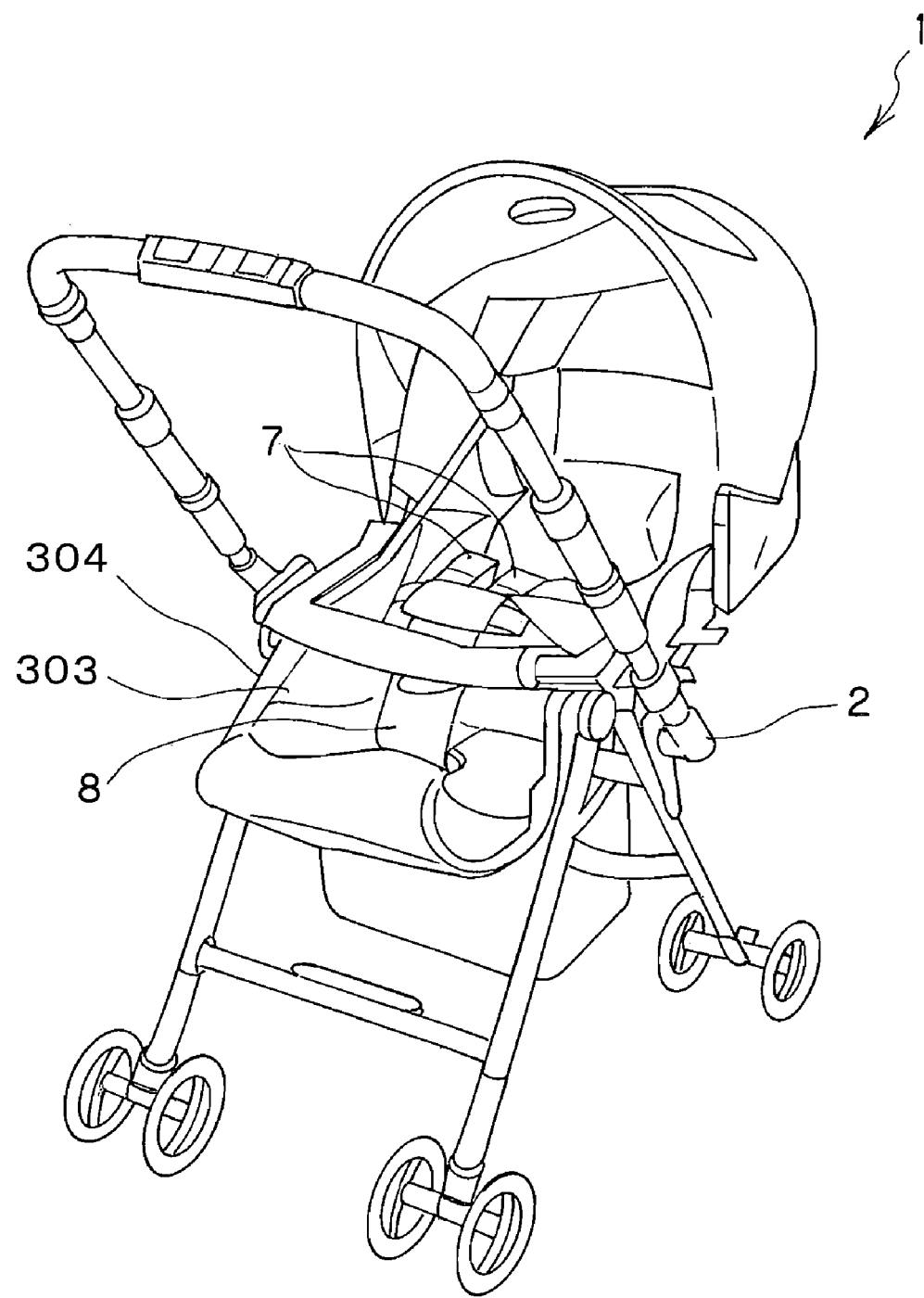
FIG. 35 is a perspective view of a baby buggy to which a cushion according to a third embodiment of the present invention is applied.

FIG. 35 illustrates a baby buggy to which a cushion of the third embodiment of the present invention is applied. The baby buggy 301 includes a baby buggy main body 302 having a frame structure arbitrarily composed of the pipe members, and a seat 303 fixed to the baby buggy main body 302. The baby buggy main body 302 is constructed foldably in the forward/rear direction and in the left/right direction; furthermore, the seat 303 is constructed reclinably. The folding mechanism and the reclining mechanism are constructed similarly to the known baby buggy.

Figure 36:
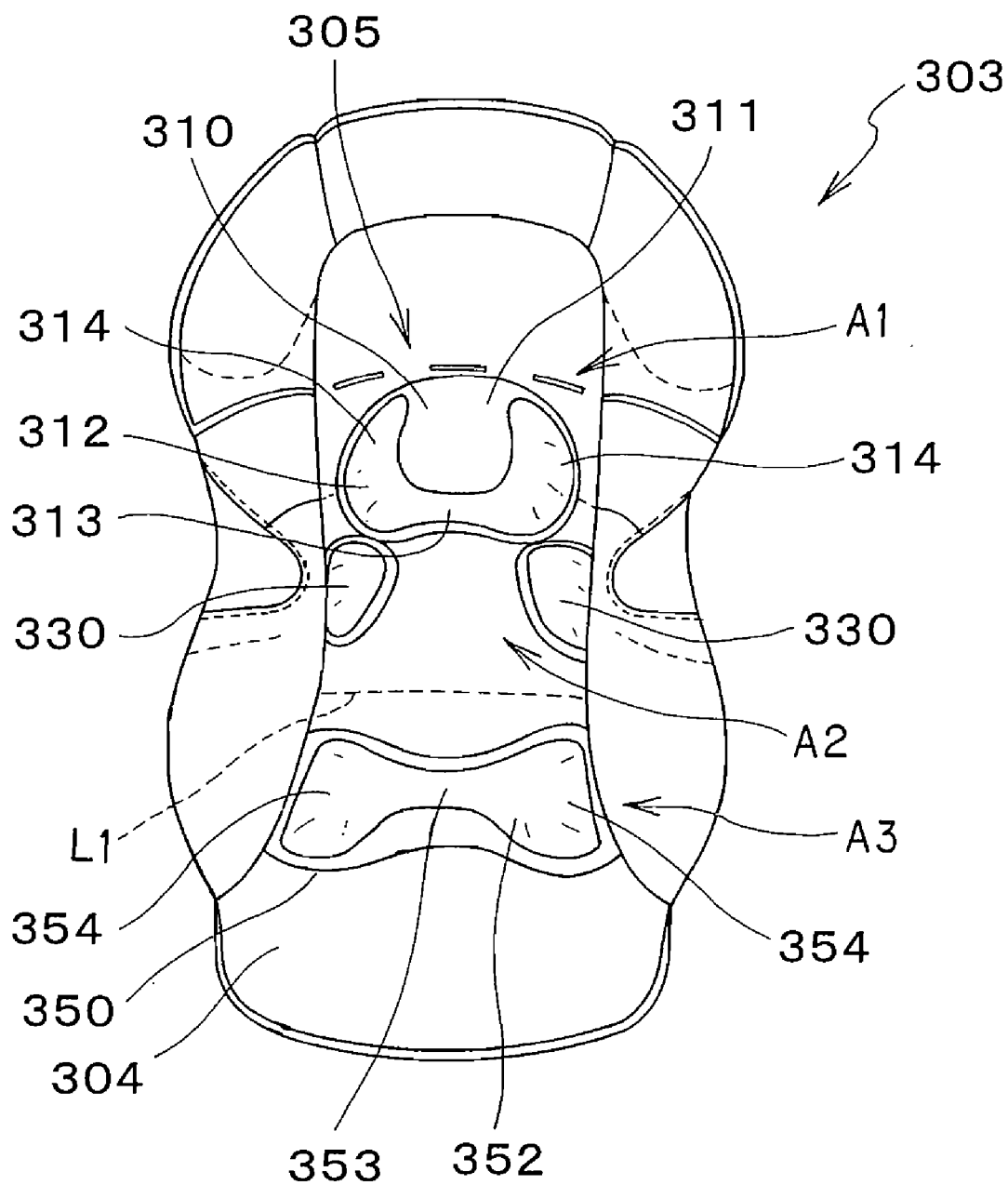
FIG. 36 is a front view of the seat of the baby buggy to which the cushion of the third embodiment is attached.

FIG. 36 is a front view of the seat 303. The seat 303 is constructed by covering the seat main body 309 (It is not shown, but similarly constructed to the seat main body 409 in FIG. 38) with a seat cover 304. The seat main body is made of plastics or the like, thereby to have enough stiffness to retain the shape of the seat. In other words, the seat main body works as a core having enough stiffness to retain a specific shape of the seat without depending on other supporting means. The seat 303 is foldable along the folding line L1. The seat cover 304 is removable from the seat main body. A cushion 305 of the third embodiment is arranged on the seat cover 304. The cushion 305 includes a head pad 310 to be placed on the head supporting portion A1 of the seat 303, a pair of left/right waist pads 330 to be placed on the waist supporting portion A2 of the seat 303, and a hip pad 350 to be placed on the hip supporting portion A3 of the seat 303. These pads 310, 330, 350 are constructed as separate components. Furthermore, the respective pads 310, 330, 350 are constructed in different processes from either of the seat main body of the seat 303 and the seat cover 304.

The head pad 310 includes a base sheet 311 and a protruded portion 312 formed on the base sheet 311. The base sheet 311 is formed in a shape of a plate having a rounded outer periphery. The protruded portion 312 includes a neck supporting portion 313 extending along the lower rim of the base sheet 311, and a pair of head side supporting portions 314 extending along the both rims of the base sheet 311. The neck supporting portion 313 is employed to support the back neck of the child, and the head side supporting portion 314 is employed to support the head of the child from the side thereof. The neck supporting portion 313 and the head side supporting portion 314 are connected in a unit.

Inside the head pad 310, an elastic material having proper cushioning property may be arranged as a core. For the core member, an elastic material, such as cotton, urethane, low repulsive urethane, polymeric gel can be used. The core member may be arranged only inside the protruded portion 312, or inside both the base sheet 311 and the protruded portion 312.

Each waist pad 330 includes a base sheet 331 and a protruded portion 332 formed on the base sheet 331 such that the height of the protruded portion 332 is gradually reduced from the apex 32a toward the whole outer periphery of the base sheet 331. These waist pads 330 are employed to prevent the side slip of the waist of the child by bringing the waist pads 330 in contact with the waist of the child from the both sides. The outer periphery of the contact portion on which the base sheet 331 and the protruded portion 332 are contacted may be formed in various shapes, such as a circle, an eclipse, an oval, a rectangular rounds, an egg shape. Inside the waist pad 330, an elastic material having proper cushioning property may be also arranged as a core. For the core member, an elastic material, such as cotton, urethane, low repulsive urethane, polymeric gel can be used. Furthermore, the left/right waist pads 330 may be connected with each other by using a single base sheet 331.

The hip pad 350 includes a base sheet 351, a protruded portion 352 formed on the base sheet 351 and extending along the left/right direction. The base sheet 351 is formed in a plate shape. The protruded portion 352 has a hip supporting portion 353 and a pair of knee supporting portions 354 formed on both end portions of the hip supporting portion 353. The hip supporting portion 353 is employed to support the hip of the child; and the knee supporting portions 354 are employed to support the knees of the child from the side. The hip supporting portion 353 and the knee supporting portion 54 are connected in a unit.

Inside the hip pad 350, an elastic material having a proper cushioning property may be arranged as a core. For the core member, an elastic material, such as cotton, urethane, low repulsive urethane, polymeric gel can be used. The core member may be only inside the protruded portion 352, or inside both the base sheet 351 and the protruded portion 352.

The pads 310, 330, 350 having the above-mentioned constructions are fixed inseparably on the surface of the seat cover 304. Various other fixing methods, such as press by heat, namely, a method of fixing with the heat melt of plastics or the like, sewing, or gluing, can be used. When thus fixed, the pads 310, 330, 350 can be retained at the optimal positions on the seat cover 304, and the positional shifts of the pads 310, 330, 350 relative to the seat cover 304 can be prevented, thereby to achieve a reliable and proper effect of retaining the posture of the child with the pads 310, 330, 350. Furthermore, since the pads 310, 330, 350 are fixed on the surface of the seat cover 304 which is attachable to and removable from the seat main body, the pads 310, 330, 350 are exposed on the surface of the seat 303. Accordingly, the position where a child is retained can be clearly conceived from the positions of these pads 310, 330, 350. Furthermore, the positions of the pads 310, 330, 350 on the seat 303 can be changed by exchanging the seat covers 304. For example, multiple seat covers 304 are prepared for various physical sizes of the child, then one seat 303 is applicable to the children of a wide range of physical sizes by putting a seat cover 304 properly selected from these covers on the seat main body.

Figure 37:
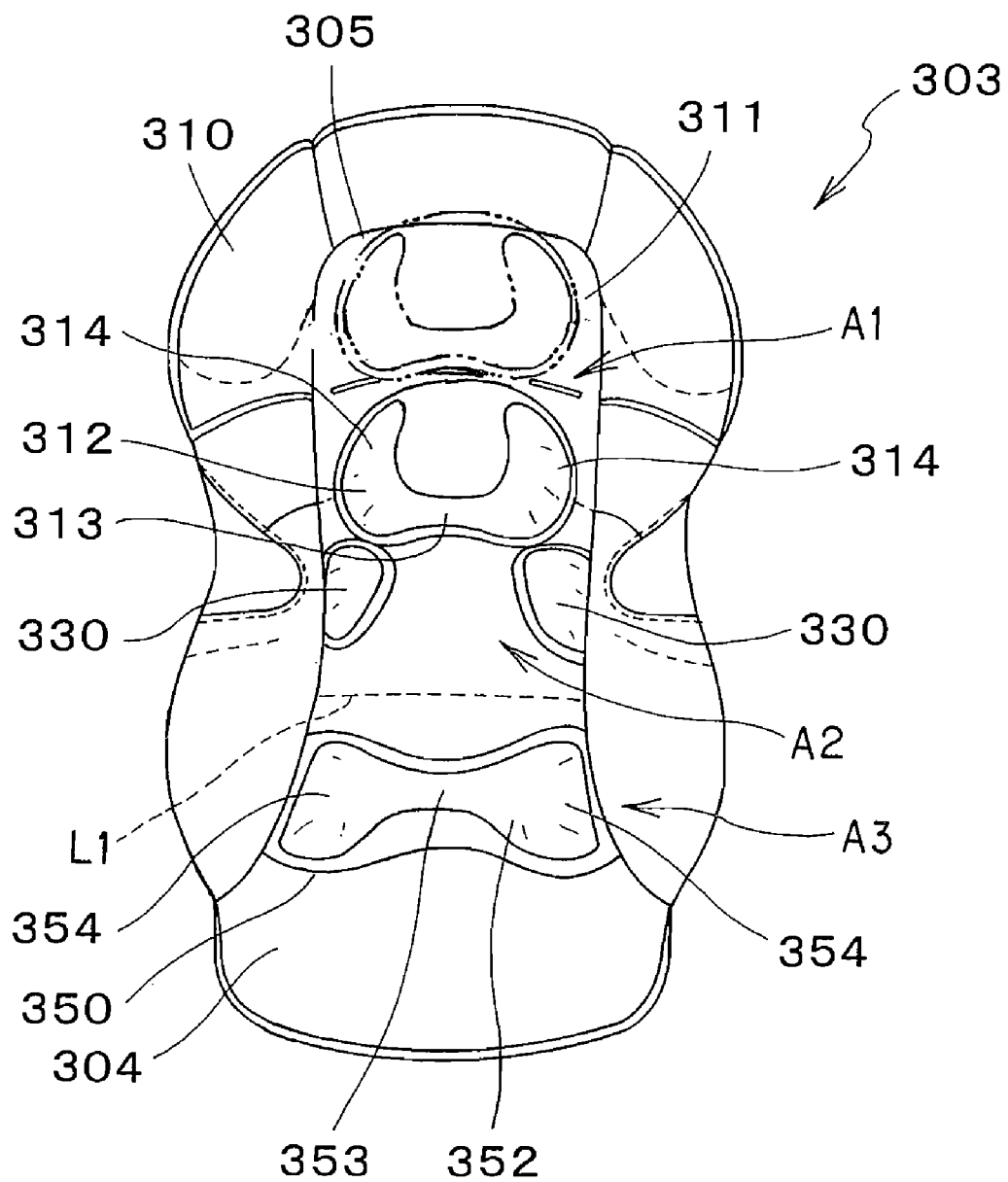
FIG. 37 illustrates a modification from the seat of FIG. 36.

In the above embodiments, all of the pads 310, 330, 350 are fixed inseparably to the seat cover 304; however, a part of the pads may be fixed separably to the seat cover 304. For example, the optimal position of supporting the hip of the child is almost unchanged regardless of the physical size of the child. Accordingly, as shown in FIG. 37, the head pad 310 may be fixed removably and position adjustably along the up/down direction of the seat 303 (the up/down direction in FIGS. 36, 37) to the seat cover 304, while the waist pad 330 and the hip pad 350 are fixed inseparably to the seat cover 304. In this case, the child is positioned on the seat cover 304 such that the hip of the child fits on the hip pad 350, and then the position of the head pad 310 is changed in accordance with the physical size of the child as shown with a virtual line in FIG. 37. Thus, the acceptable range of the physical size of the child can be enlarged. Furthermore, since the hip pad 350 is fixed inseparably on the seat cover 304, the position of the hip pad 350 does not shift on the seat cover 304. Accordingly, the construction has an advantage able to reliably suppress the forward slip of the hip of the child with the hip pad 350 even when the back portion of the seat 303 is set back. Furthermore, the waist pad 330 may also be fixed separably on the seat cover 304. Furthermore, the waist pad 330 may be arranged position adjustably on the seat cover 304 in the up/down direction or the left/right direction of the seat 303.

Fourth Embodiment

Figure 38:
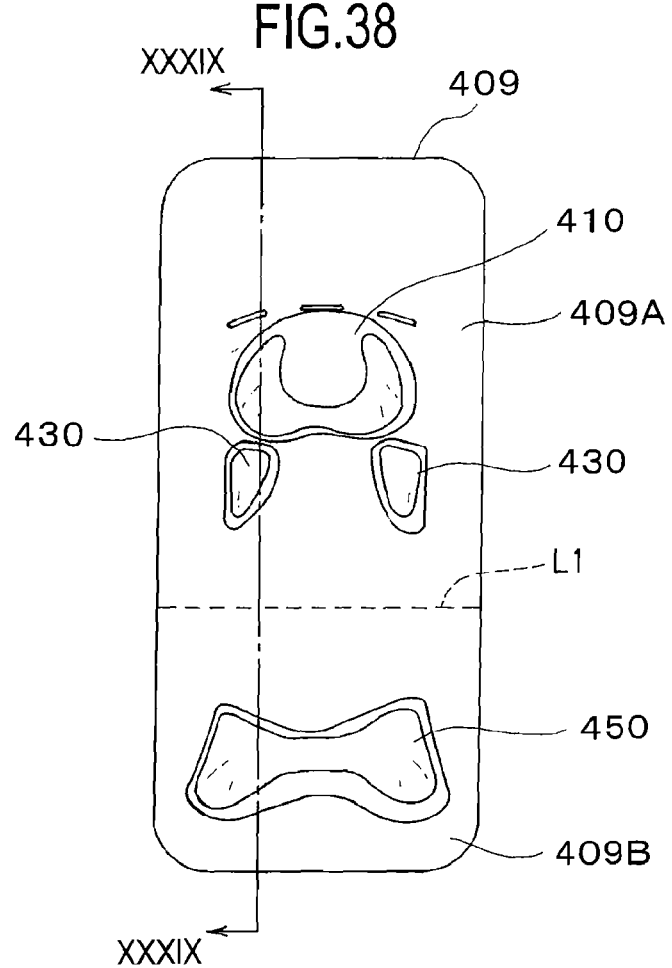
FIG. 38 is a front view of the seat main body of the baby buggy to which the cushion of the fourth embodiment is applied.
Figure 39:
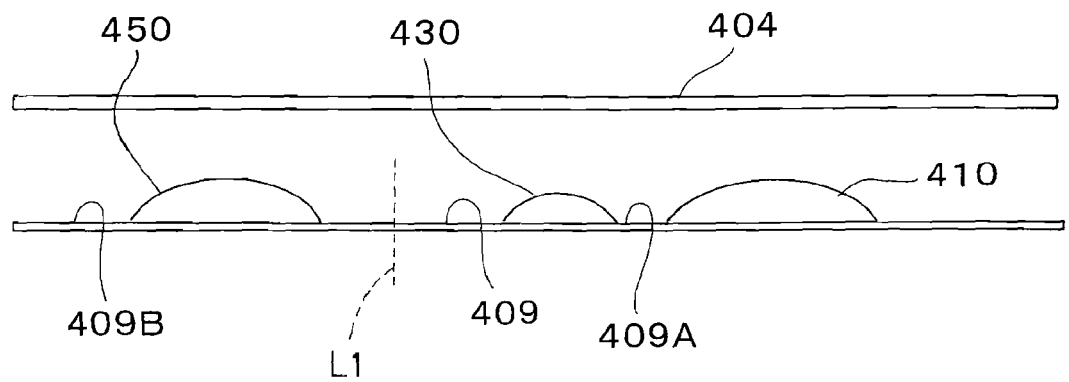
FIG. 39 is a cross-sectional view of the child supporting structure along the XXXIX-XXXIX line in FIG. 38.

FIGS. 38 and 39 illustrate a seat main body 409 of a seat to which a cushion according to a fourth embodiment of the present invention is applied. The present embodiment is common with the third embodiment in that the cushion includes a head pad 410, a pair of waist pads 430 and a hip pad 450. Furthermore, the constructions of the pads 410, 430, 450 are sane as those of the third embodiment. However, the fourth embodiment differs from the third embodiment in that directly on the surface of the seat main body 409, the pads 410, 430, 450 are inseparably. The seat main body 409 is constructed such that the back plate 409A and the seat plate 409B are connected foldably along the folding line L1; the head pad 410 and the waist pad 430 are fixed on the back plate 409A; and the hip pad 450 is fixed on the seat plate 409B. The seat main body 409 is covered removably with the seat cover of the third embodiment without the cushion 305.

According to the fourth embodiment, the seat cover 404 is transformed in accordance with the surface undulation of the pads 410, 430, 450 when the seat cover 404 is put on the seat main body 409. Accordingly, an undulated shape for supporting the child is provided to the surface of the seat 403. If the pads 410, 430, 450 are fixed on the seat main body 409, the pads 410, 430, 450 may remain on the seat main body 409 when the seat cover 404 is removed from the seat main body 409. Thus, the work of removing the cushion 405 from the seat cover 404 can be saved in washing the seat cover 404.

In the fourth embodiment, a part of the pads 410, 430 and 450 may be arranged separably on the seat main body 409. Furthermore, these separable pads may be arranged position adjustably along the up/down direction of the seat 403. In this case, the hip pad 450 is most preferably fixed inseparably on the seat main body 409 as the reasoning mentioned above.

Figure 40:
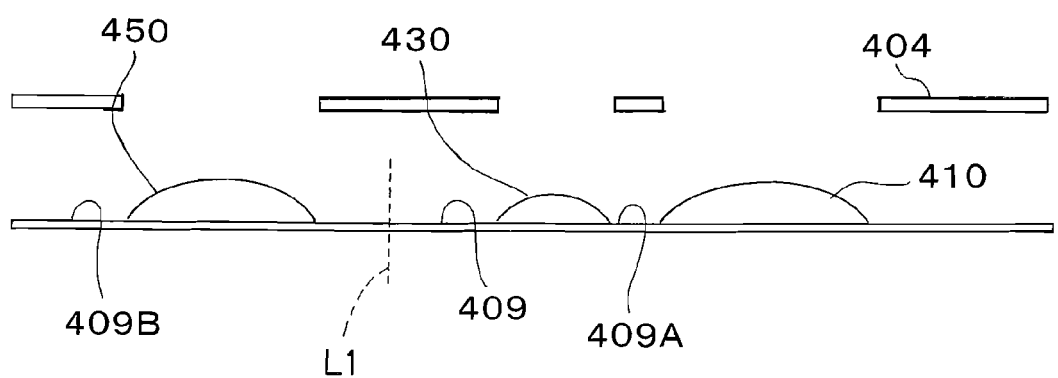
FIG. 40 illustrates a modification of the child supporting structure of FIG. 38.

Furthermore, through holes 404a, 404b, 404c maybe formed on the seat cover 404 corresponding to the positions of the pads 410, 430, 450, as shown in FIG. 40. This construction will be also referred as a child supporting structure. According to the structure, the cushion 405 does not need to be removed when the seat cover 404 is removed from the seat main body 409. Furthermore, since the convex portions of the pads 410, 430, 450 are exposed directly on the surface of the seat 403, the pads 410, 430, 450 can achieve a maximum effect of retaining the posture of the child. For example, when a cushioning material or the like is arranged inside the seat cover 404, this construction has an advantage in that the retention of the posture of the child with the pads 410, 430, 450 is not affected by the existence of the core member inside the seat cover 404.

The present invention is not limited to the above-mentioned constructions; the present invention may be carried out in arbitrary constructions. For example, the neck supporting portion and the head side supporting portions of the head pad may be used separately. The cushion of the present invention is not limited to the cushion having a head pad, a waist pad and a hip pad, a part of the pads may be omitted or additional pads may be applied to the cushion. The present invention can be applicable not only to a baby buggy, a portable infant bed, and child safety seat but also to various child products using a cushion.

What is claimed is:

1. A cushion adapted to be placed on a child safety seat for a vehicle in order to retain a posture of a child in a seating condition, comprising:
   a head pad having:
      a neck supporting portion for supporting the neck of a child, the portion protruding outwardly along a lower rim of the head pad; and
      a pair of head side supporting surfaces for supporting the head of the child from both sides of the head of the child, each of the head side supporting surfaces being inclined upwardly toward a left or a right end of the head pad; and
   a back pad having a pair of body side supporting surfaces for supporting the body sides of the child, each of the body side supporting surfaces being inclined upwardly toward a left or a right end of the back pad; and
   a hip pad having:
      a hip supporting surface for supporting the hip of the child, the hip supporting surface being inclined upwardly from a rear end of the hip pad toward a front end of the hip pad;
      a pair of knee supporting surfaces for supporting the knees of the child, each of the knee supporting surfaces being inclined upwardly toward a left or a right end of the hip pad;
      a leg supporting surface is formed on the hip pad in a front of the hip supporting surface, and the leg supporting surface is inclined downwardly toward the front end of the hip pad; and
   a belt pass-through hole, through which a crotch belt provided on the child safety seat passes, is opened on the leg supporting surface so that a ridge line defining a boundary between the hip supporting surface and the leg supporting surface is positioned rearward from the belt pass-through hole,
   wherein the ridge line is an intersection point between the upward incline of the hip supporting surface and the downward incline of the leg supporting surface, and
   wherein the back pad and the hip pad are separable from each other, so that the back pad can be placed on a back portion of the child safety seat and the hip pad can be placed on a seat portion of the child safety seat.

2. The cushion according to claim 1, wherein a ridge line of the neck supporting portion is curved concavely toward the pair of head side supporting surfaces in a height direction of the head pad from a central portion of the head pad in a left and a right direction of the head pad.

3. The cushion according to claim 1, wherein a recess is formed on the central portion of the head pad in a left and a right direction of the head pad, and
   wherein the recess is framed by the neck supporting portion and the pair of head side supporting surfaces and is opened to an upper rim of the head pad.

4. The cushion according to claim 1, wherein a back supporting surface for supporting the back of the child is formed between the body side supporting surfaces of the back pad, and
   wherein the back supporting surface is formed in a shape of a slope surface inclined downwardly from a lower end side of the back pad toward an upper end side of the back pad.

5. The cushion according to claim 4, wherein a slant surface inclined upwardly toward the back supporting surface is formed on an end portion of a lower rim side of the back pad.

6. The cushion according to claim 1, wherein the hip supporting surface of the hip pad is curved concavely in a height direction of the hip pad from a central portion of the hip pad in a left and a right direction of the hip pad.

7. The cushion according to claim 1, wherein the knee supporting surface of the hip pad is extended toward a front of the hip pad farther than the hip supporting surface.

8. The cushion according to claim 1, wherein the head pad and the back pad are separable from each other.

9. The cushion according to claim 1, wherein the head pad is arranged position adjustably on the back pad along an up and a down direction of the child safety seat.

* * * * *